US012633661B1

(12) United States Patent
Sharma et al.

(10) Patent No.: US 12,633,661 B1
(45) Date of Patent: May 19, 2026

(54) ENERGY EFFICIENT PHASE SHIFTING IN DIGITAL BEAMFORMING CIRCUITS FOR PHASED ARRAY ANTENNAS

(71) Applicant: Amazon Technologies, Inc., Seattle, WA (US)

(72) Inventors: Sunny Sharma, Shoreline, WA (US); Jung Joo Lee, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 156 days.

(21) Appl. No.: 18/748,999

(22) Filed: Jun. 20, 2024

Related U.S. Application Data

(63) Continuation of application No. 17/111,397, filed on Dec. 3, 2020, now Pat. No. 12,040,557.

(51) Int. Cl.
*H01Q 3/38* (2006.01)
*H01Q 3/40* (2006.01)

(52) U.S. Cl.
CPC ................. *H01Q 3/38* (2013.01); *H01Q 3/40* (2013.01)

(58) Field of Classification Search
CPC ............... H01Q 3/38; H01Q 3/40; H01Q 3/30
See application file for complete search history.

(56) References Cited

U.S. PATENT DOCUMENTS

| | | | | |
|---|---|---|---|---|
| 4,166,999 | A | 9/1979 | Brady, III | |
| 11,095,350 | B1 * | 8/2021 | Montalvo | H04B 7/0617 |
| 2022/0360303 | A1 * | 11/2022 | Rainish | H04B 7/0848 |

FOREIGN PATENT DOCUMENTS

| | | | |
|---|---|---|---|
| CN | 104883156 | A | 9/2015 |

OTHER PUBLICATIONS

G Hampson and A Paplinski, "Phase Shift Beamforming Using Cordic," Fourth International Symposium on Signal Processing and Its Applications, Gold Coast, QLD, Australia, 1996, pp. 684-687. (Year: 1996).*

S. Mondal, R. Singh, A. I. Hussein and J. Paramesh, "A 25-30 GHz Fully-Connected Hybrid Beamforming Receiver for MIMO Communication," in IEEE Journal of Solid-State Circuits, vol. 53, No. 5, pp. 1275-1287, May 2018, doi: 10.1109/JSSC.2018.2789402. (Year: 2018).*

Hampson G., et al., "Phase Shift Beamforming Using Cordic," Fourth International Symposium on Signal Processing and its Applications, ISSPA, Gold Coast, QLD, Australia, Aug. 25-30, 1996, pp. 684-687.

(Continued)

*Primary Examiner* — Yonghong Li
(74) *Attorney, Agent, or Firm* — Kilpatrick Townsend & Stockton LLP

(57) ABSTRACT

Technologies directed to energy efficient phase shifting in digital beamforming in phased array antennas in communication systems are described. Digital signal processing (DSP) circuitry includes a first phase shifter that generates second data by phase shifting first data according to a rotation-based operation without multiplication of the second data, a second phase shifter that generates fourth data by phase shifting third data according to the rotation-based operation without multiplication of the fourth data, a combiner that generates fifth data by adding the second data and the fourth data, and a multiplier that generates sixth data by multiplying the fifth data by a constant value.

20 Claims, 11 Drawing Sheets

(56) References Cited

OTHER PUBLICATIONS

Mondal S., et al., "A 25-30 GHz Fully-Connected Hybrid Beamforming Receiver for MIMO Communication," in IEEE Journal of Solid-State Circuits, May 2018, vol. 53, No. 5, pp. 1275-1287, DOI: 10.1109/JSSC .2018.2789402.

Wikibooks., "Digital Circuits—Cordic," Wikibooks, open books for an open world, 2018, 9 pages. fromhttps://web.archive.Org/web/20180925121651/https://en.wikibooks.org/wiki/Digital_Circuits/CORDIC (Year: 2018).

Wikipedia: "Cordic," 2019, 17 Pages, Retrieved from URL: https://web.archive.Org/web/20191202033902/https://en.wikipedia.org/wiki/CORDIC.

* cited by examiner

ENERGY EFFICIENT PHASE SHIFTING IN DIGITAL BEAMFORMING CIRCUITS FOR PHASED ARRAY ANTENNAS

RELATED APPLICATIONS

This application is a continuation of U.S. patent application Ser. No. 17/111,397, filed Dec. 3, 2020, the entire contents of which are incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
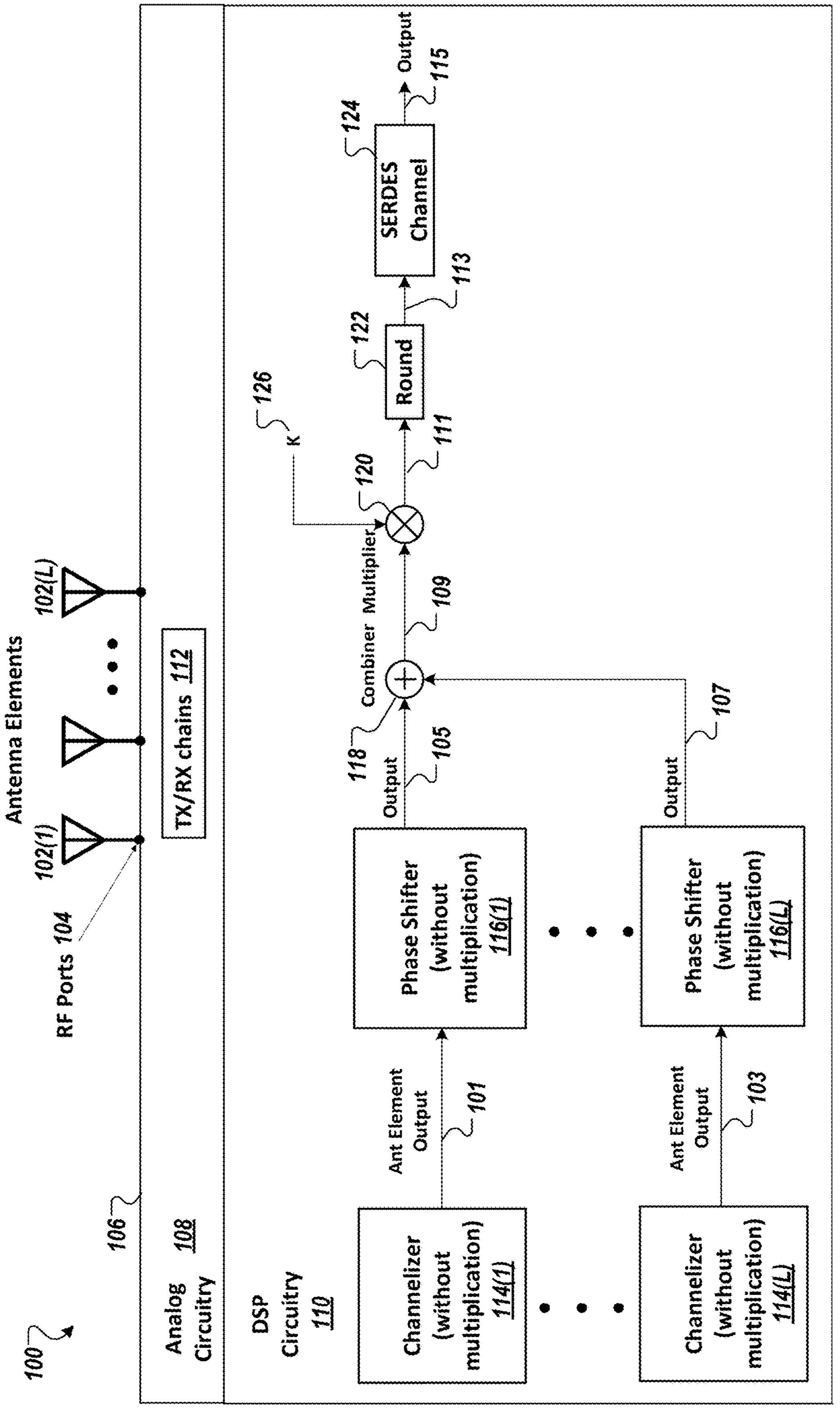
FIG. 1 is a functional diagram of a communication system with digital signal processing (DSP) circuitry for energy efficient phase shifting in digital beamforming phased arrays, according to at least one embodiment.

Technologies directed to energy efficient phase shifting in digital beamforming in phased array antennas in communication systems are described. In an electronically steered phased array, predictable beam patterns are formed by individually controlling the relative time delay or relative phase shift of the signal between each antenna element. The direction of the transmitted or received electromagnetic energy is also spatially steered by altering the relative time delays or relative phase shift between the antenna elements, resulting in constructive interference in the desired direction and destructive interference in other directions. When a beam arrives or departs at a given scan angle, each antenna element is excited with a relative time delay or relative phase shift to the other antenna elements. Continual advancements in the semiconductor technology have made digital beamforming systems more attractive from both cost and efficiency point of views. Digital beamforming solutions provide ultimate flexibility when constructing multi-beam phased array systems. In such systems, each antenna element is connected to a radio frequency (RF) transceiver and all of the beamforming algorithms and logic reside in a digital domain of a beamforming integrated circuit (IC). With an emphasis on increased integration, a beamforming IC can be connected to L number of antenna elements and contains L down-conversion and/or L up-conversion chains. The relative phase alignment of each transceiver is realized by independent digital phase shifters for each antenna element and beam. For a phased array system that supports M number of transmit/receive beams, the number of digital phase shifters equal M times L, which can be a very large number. Therefore, lowering the cost and power of each digital phase shifter is critical for achieving low power operation.

A digital phase shifter in a digital beamformer is typically implemented with a complex multiplier. A complex signal that includes an in-phase (I) component and a quadrature (Q) component can be phase shifted by an angle θ to generate I' and Q' data as follows in equations (1) and (2):

$$I'=I\times\cos\theta-Q\times\sin\theta \quad (1)$$

$$Q\times\cos\theta+I\times\sin\theta \quad (2)$$

The above equations represent the complex multiplication operation (I+jQ)×(cos θ+j sin θ). A typical complex multiplier in a digital beamformer includes four real multipliers and three adders. For example, given two complex operands, a+jb and c+jd, complex multiplication yields (assuming a subtraction is equivalent to an addition), as set forth in equation (3).

$$(a+jb)\times(c+jd)=(ac-bd)+j(bc+ad) \quad (3)$$

If the cost of an adder is much less than the cost of a real multiplier, which is usually the case, the above logic can be modified to save one multiplier at the expense of three more adders. Equation (3) can be rewritten as follows in equation (4):

$$(ac+bd)+j(bc-ad)=[a(c+d)-d(a+b)]+j[a(c+d)+c(b-a)] \quad (4)$$

Some digital beamformer circuits include multiple channels using an N-channel channelizer. Each of the output channels of the N-channel channelizer is multiplied with a 1/N scaling factor. As such, given L receiver chains, N frequency channels, and M independent beams per channel in a DBF device, the number of multiplication operations in a traditional digital phase shifter implementation is set forth in equation (5) below.

$$\text{Number of Multiplications}=L\times[2N+3(N\times M)]+2(M\times N) \quad (5)$$

For example, where L=36, N=30, and M=16, Equation (5) results in 54,960 multipliers. The large number of multipliers reduces energy efficiency, especially when being scaled with a large number of antenna elements, multiple channels, and/or multiple beams.

Aspects of the present disclosure overcome the deficiencies of conventional digital beamforming circuits by providing multiplier-less phase shifters for digital phase shifts and by combining Inverse Fast Fourier Transform (IFFT) scaling, gain scaling, and element combiner scaling into a single scaling factor. One low power digital phase shifting system for digital beamforming phased array antennas can receive broadband data. The received broadband data is down-converted and digitized separately for each antenna element in a phased array antenna. The digital data is then channelized by an N-channel channelizer that includes an N-point IFFT. Digital phase shifts are performed using Coordinate Rotation Digital Computer (CORDIC) before digitally combining the phase aligned data from other receive paths in the element combiner to generate beamformed data. The element combiner appropriately scales the phase-aligned data to reduce the magnitude of the signal and occupied data bus width. CORDIC and N-point IFFT blocks also require digital scaling. Low power operation can be achieved by merging the IFFT scaling, CORDIC scaling, and element combiner scaling. The aforementioned technique is extended to multi-beam synthesis and may also be applied to a transmit digital beamforming phased array system. With this architecture, the scaling only depends on a total number of beams (referred to herein as M) and is independent of a number of receiver chains (referred to herein as L) and a number of receive channels (referred to herein as N).

FIG. 1 is a functional diagram of a communication system 100 with digital signal processing (DSP) circuitry for energy efficient phase shifting in digital beamforming phased arrays, according to at least one embodiment. Communication system 100 includes antenna elements 102 and a digital beamforming (DBF) device 106, which includes analog circuitry 108 and DSP circuitry 110. Antenna elements 102 may be disposed in an organized formation (e.g. such as formed in a circular pattern, a rectangular pattern, a hexagonal pattern, or the like) on a circuit board or other support structure. Antenna elements 102 are coupled to the DBF device 106, such as to RF ports 104 of the DBF device 106. Each antenna element 102 can be communicatively coupled to individual phase shifters 116 of the DBF device 106 through RF ports 104 and transceiver (transmitter (TX)/receiver (RX)) chains 112. For example, each antenna element 102 is coupled to one of the transceiver chains 112. A TX/RX chain 112 can include up-converters, down-converters, mixers, amplifiers, filters, analog-to-digital converters (ADCs), digital-to-analog converters (DACs), or the like. It should be noted that FIG. 1 is a simplified illustration and the phase shifters 116 may not be directly coupled to the RF ports 104. For example, the DSP circuitry 110 can include one or more data paths, one or more data buffers, or the like to store digital data generated by ADCs in analog circuitry 108.

DSP circuitry 110 can include one or more channelizers 114, one or more DSP blocks, and serializer/deserializer (SERDES) circuitry 124, the DSP blocks including multiple phase shifters, a combiner, a multiplier, and a round block. The DSP blocks can be scaled for the number of channels, the number of beams, and the number of antenna elements. The DSP blocks of DSP circuitry 110 can each be implemented as a processing element of the DBF device 106, such as a discrete component, a discrete circuit, logic circuitry, a digital functional block, a programmable block, such as a DSP functional block, or the like. These DSP blocks can be allocated on a per channel basis and can be scaled for one or more beams as described herein. A simplified portion of DSP circuitry 110 is illustrated in FIG. 1. These DSP blocks can be implemented in a digital domain of the DBF device 106.

In some embodiments, a signal beam is received across antenna elements 102 of an array antenna. The signal beam is transmitted through RF ports 104 to phase shifters. In some embodiments, phase shifters 116 can be CORDIC phase shifters, such as illustrated and described below with respect to FIGS. 4-5. Phase shifters 116(1)-(L) may perform a phase shifting process by a rotation based operation (e.g., a rotation algorithm) without using a multiplication operation. For example, phase shifters 116(1)-(L) may include multiplier-less phase shifters that do not use a multiplication step to phase shift an incoming signal. As described herein, an incoming signal experiences a single multiplier operation by multiplier 120. To arrive at the antenna elements 102, the incoming signal beam may include variable path lengths to reach individual antenna elements 102 of the array antenna. The signal beam can be a primary beam made up of several subbeams that may or may not arrive from the same direction. For example, subbeams of a signal beam propagating at 45 degrees from nadir relative to the surface of the array antenna travel further to reach antenna elements 102 on a far side of the array antenna than to reach antenna elements on a near side of the array antenna relative to the incoming signal beam. The variable path length may result in the antenna elements 102 receiving the incoming signal beam in various phases across the array antenna. Each phase shifter 116 receives subbeams of the signal from an associated antenna element 102. A phase shifter 116 applies a phase shift to the subbeams of the incoming signal. For example, phase shifter 116 may apply a relative phase shift to each subbeam such that each signal of the total incoming signal is realigned to be in phase. The relative phase shift may be associated with the variable path length of the signal across each of the antenna elements 102. The relative phase shift for an individual phase shifter 116 may be associated with the spatial location of an associated antenna element 102 of the array antenna.

In some embodiments, a phase shifter 116 is associated with multiple antenna elements 102. For example, a DBF device 106 may include one phase shifter 116 that is coupled to receive signals from multiple antenna elements 102 of the DBF device 106. As noted above, the phase shifter 116 is not necessarily coupled to an antenna element 102. For example, there can be a down-conversion chain, including an analog-to-digital converter, before a signal gets to the phase shifter 116. Each phase shifter 116 may shift the phase of signals received by multiple antenna elements 102. In another example, a DBF device 106 may include a phase shifter 116 for each antenna element such that each phase shifter 116 is associated only with an individual antenna element 102 of the array antenna.

As shown in FIG. 1, combiner 118 receives each of the phase compensated signals from each of phase shifters 116. Combiner 118 combines the phase compensated signals to form a combined signal that is substantially in phase. Combiner 118 sends the combined signal to multiplier 120.

As shown in FIG. 1, multiplier 120 multiplies the combined signal received from the combiner 118 by a constant multiplier value 126. As described herein, this architecture realizes energy efficient digital beamforming by implementing multiplier-less phase shifters for digital phase shifts and combining the IFFT scaling, the gain scaling for phase shifts, and the element combiner scaling into a single scaling factor—constant multiplier value 126. Constant multiplier value 126 can be stored in a register or other memory element. A phase shift coefficient for each of the phase shifters 116 can also be stored in registers or memory elements.

During operation of communication system 100, a first receiver chain of analog circuitry 108 receives a first RF signal and converts the first RF signal into first digital data and a second receiver chain of analog circuitry 108 receives a second RF signal and converts the second RF signal into second digital data. The first digital data and the second digital data are processed by DSP circuitry 110 of DBF device 106. In embodiments where channelizers are used, each N-point channelizer can process digital data corresponding to one of the antenna elements 102 according to N number of channels. As illustrated in FIG. 1, there can be L number of channelizers, where L corresponds to a number of antenna elements 102. For a first channel, a first channelizer 114(1) can process first digital data and outputs first data 101 and a second channelizer 114(L) can process second digital data and outputs second data 103. A first phase shifter 116(1) phase shifts first data 101 to obtain third data 105, the third data 105 corresponds to a first antenna element 102(1). A second phase shifter 116(L) phase shifts second data 103 to obtain fourth data 107, the fourth data 107 corresponding to a second antenna element 102(L). Combiner 118 generates fifth data 109 by adding the third data 105 and the fourth data 107. Multiplier 120 generates sixth data 111 by multiplying the fifth data 109 by the constant multiplier value 126. Constant multiplier value 126 is a single scaling factor that is a combination of multiplications typically used for IFFT scaling, CORDIC gain scaling, and element combiner scaling. Round block 122, which can perform a round function, generates seventh data 113 by rounding sixth data 111. DSP circuitry 110 also includes SERDES circuitry 124 that receives seventh data 113 and outputs digital data 115 to a second DBF device or a modem. SERDES circuitry 124 can receive data from DSP blocks for a set of M beams. SERDES circuitry 124 converts data between serial data and parallel interfaces in each direction. SERDES circuitry 124 can provide data transmission over a single line or a differential pair in order to minimize a number of interconnects between circuits. SERDES circuitry 124 can communicate data with a second DBF device or a modem.

In some embodiments, digital data includes an in-phase component and a quadrature component. In these embodiments, phase shifters 116 can phase shift both the in-phase component and the quadrature component. The combiner 118 can include two separate adders to add the respective in-phase components from each of the other phase shifters and multiplier 120 can include two separate multipliers to multiple outputs of the separate adders. A second round block can also round an output of the second multiplier. Similarly, SERDES circuitry 124 can include separate channels for the in-phase components and quadrature components. An example of DSP blocks that process in-phase components and quadrature components is described below with respect to FIGS. 4-5.

It should be noted that although various figures and embodiments describe a receiver, in other embodiments, the communication system 100 may operate as a transmitter with all the elements effectively operating in reverse. In the transmitter embodiment, the combiner 118 may act as a splitter which divides the signal into subbeams. Each subbeam may be transmitted to a phase shifter. The phase shifter may adjust the relative phase shift between the subbeams. The relative phase shift may be associated with a beam transmission the communication system is operating with. The phase compensated signal may then be transmitted to antenna elements 102 through RF ports 104. The antenna elements 102 may transmit the signal at a transmission angle. The transmission angle may be associated with the relative phase shifting of phase shifter 116.

As described above, communication system 100 provides energy efficient phase shifting in digital beamforming circuits by reducing the number of multiplications performed by the digital beamforming circuits, as compared to a digital phase shifter implementation that use complex multiplication, such as illustrated below with respect to FIG. 2A.

Figure 2A:
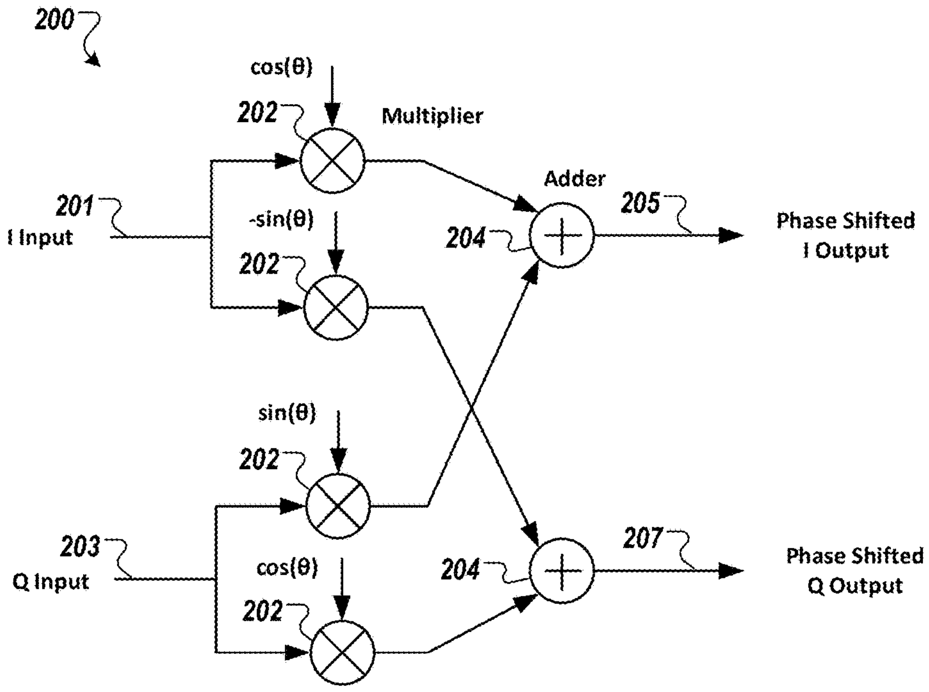
FIG. 2A is a functional diagram of a digital phase shifter implementation using complex multiplication, according to at least one implementation.

FIG. 2A is a functional diagram of a digital phase shifter implementation using complex multiplication, according to at least one implementation. Digital phase shifter 200 in a digital beamforming (DBF) device can be implemented with four multipliers 202 and two adders 204 to generate phase shifted data, including an in-phase component (I') and a quadrature components (Q'), as set forth in equations (1) and (2). That is, an incoming signal with an in-phase (I) component 201 and a quadrature (Q) component 203 can be phase shifted by an angle θ to generate I' data 205 and Q' data 207. As described above, equations (1) and (2) represent complex multiplication operation $(I+jQ)\times(\cos\theta+j\sin\theta)$. A complex multiplier can also include one or more components to implement equations (1), (2), (3), or (4). When scaled, the number of digital phase shifters 200 increase the number of multiplications being performed.

CORDIC phase shifting is another method used for applying phase shifts to complex vectors. The rotation-based CORDIC algorithm is a hardware efficient implementation since it avoids multiplications and only requires iterative shift-add operations. Arbitrary phase shift can be obtained by performing a series of successively smaller elementary phase rotations. The decision, "SIGN," of each phase rotation indicates which direction to rotate in the successive iteration to reduce the magnitude of the residual angle in an accumulator, such as illustrated in FIG. 2B.

Figure 2B:
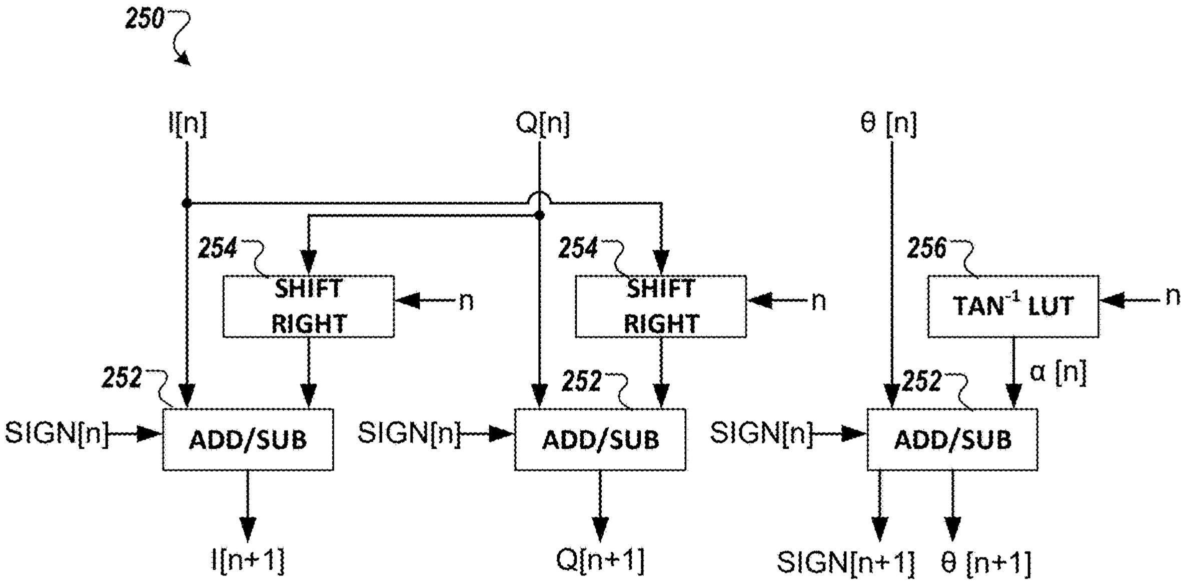
FIG. 2B is a functional diagram of a Nth Coordinate Rotation Digital Computer (CORDIC) iteration of a CORDIC phase shifter, according to at least one implementation.

FIG. 2B is a functional diagram of an Nth Coordinate Rotation Digital Computer (CORDIC) iteration of a CORDIC phase shifter 250, according to at least one implementation. Each CORDIC micro-rotation includes three additions 252, two shifts 254, and one table lookup 256. For a complex in-phase (I) and quadrature (Q) signal 251, the CORDIC equations (6)-(9) for each iteration are:

$$I[n+1]=I[n]-\{\mathrm{SIGN}[n]\times 2^{-n}\times Q[n]\} \tag{6}$$

$$Q[n+1]=Q[n]+\{\mathrm{SIGN}[n]\times 2^{-n}\times I[n]\} \tag{7}$$

$$\theta[n+1]=\theta[n]-\{SIGN[n]\times 2^{-n}\times TAN^{-1}(2^{-n})\} \quad (8)$$

$$TAN^{-1}(2^{-[0:niter-1]}) = [45.0, 26.56, 14.04, 7.13, 3.58, 1.79, 0.9, 0.45, \ldots] \text{ degrees} \quad (9)$$

Due to additions involved in the algorithm, each rotation is greater than one and the final resulting vector's magnitude is larger than the input vector. While this isn't desirable, the increase in magnitude converges to a constant value of 1.647, as noted in Equation (10).

$$K_{CORDIC} = \prod_{k=0}^{\infty}\left(1+2^{-2k}\right)^{\frac{1}{2}} \approx 1.647 \quad (10)$$

This is referred to as "CORDIC gain." A scaling factor is applied to correct for $K_{CORDIC}$ at the cost of two extra multiplications, i.e. one for the I signal and one for the Q signal. Therefore, standard CORDIC implementation still requires two real multipliers per phase shift operation which adds power and area overhead.

Another important feature of a receiver DBF IC is to extract multiple narrowband channels from the received RF band for baseband processing, such as using an N-channel channelizer as illustrated and described below with respect to FIG. 2C. Conversely, a transmit DBF IC inserts multiple narrowband channels into the RF band for transmission.

Figure 2C:
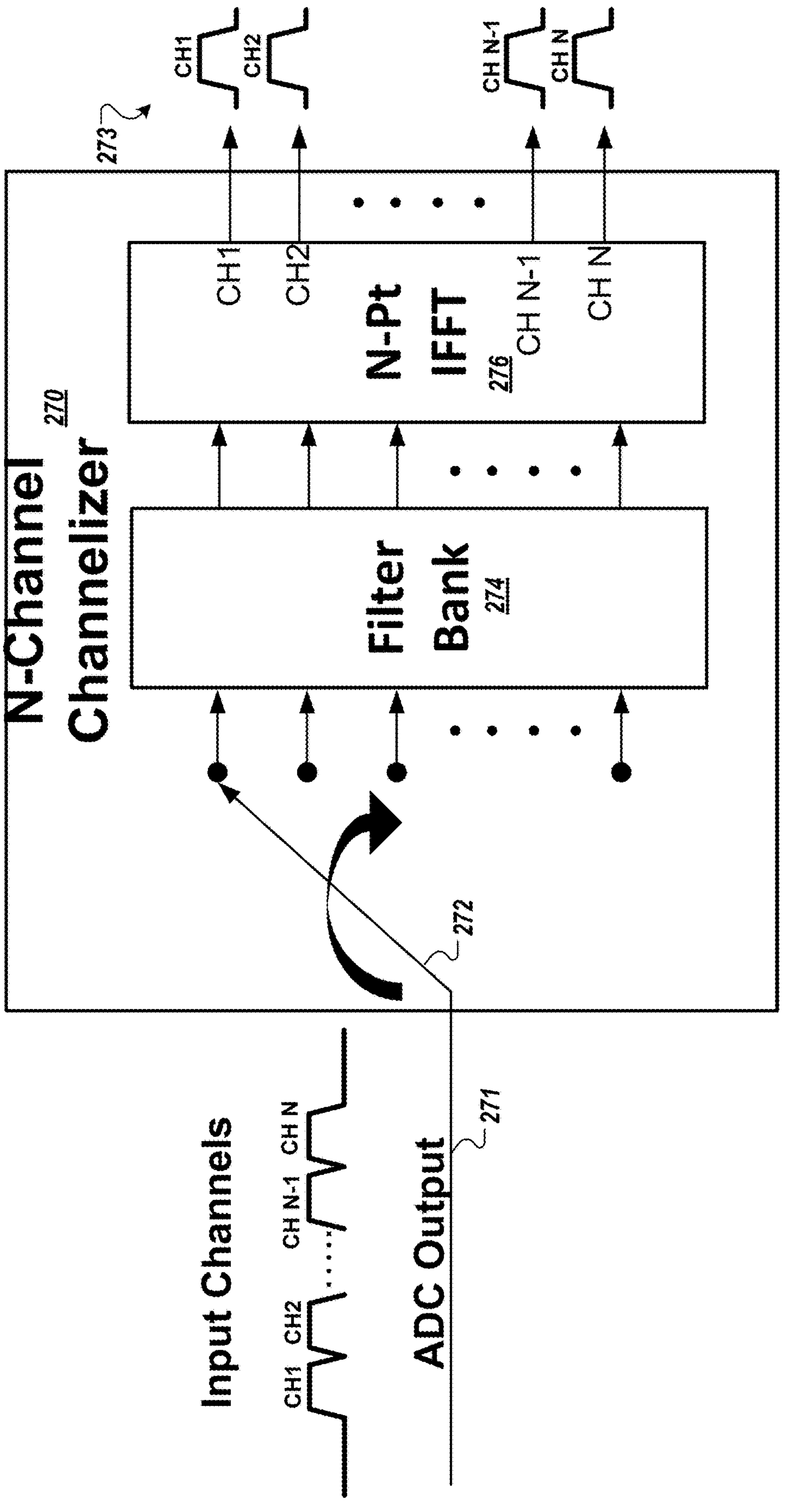
FIG. 2C is a functional diagram of an N-channel channelizer, according to at least one embodiment.

FIG. 2C is a functional diagram of an N-channel channelizer 270 according to at least one embodiment. N-channel channelizer 270 contains an input switch 272, a polyphase filter bank 274, and an N-point IFFT block 276, to extract N narrowband channels 273 from a broadband ADC output 271. In one embodiment, each user in a system is assigned to one or multiple frequency channels in the RF band to support simultaneous multi-user reception or transmission. The channelization technique, which is used to isolate baseband channels and reduce the sample rate, is based on a polyphase filter bank 274. This architecture can reduce cost due to major reduction in system resources required to perform the multichannel processing. This architecture can leverage three interacting processes to channelize the data: 1) an input commutator switch 272 for down-sampling, 2) a polyphase filter bank 274 to isolate channels, and 3) a discrete time IFFT block 276 to convert each channel to baseband data.

In one embodiment, the discrete Fourier transform (DFT) for IFFT block 276 can implement the formula as set forth in equation (11).

$$x(n) = \frac{1}{N}\sum_{k=0}^{N-1} X(k) \times e^{j\left(\frac{2\pi}{N}\right)nk} 0 \le n < N \quad (11)$$

This formula has a constant 1/N scaling factor after the multiplication and adding operations, where N represents the number of channels and the IFFT size. Each of the output channels of the N-channel channelizer 270 is multiplied with the 1/N scaling factor. The number of multipliers required scales proportionally with the number of antenna elements and the number of baseband channels in the DBF IC.

One of the most attractive features of a phased array system is frequency reuse with spatial diversity that is achieved via processing multiple simultaneous beams arriving from different directions. For a receive digital beamforming architecture, such as illustrated in FIG. 3, a separate independent channelizer for each individual receiver chains is required.

Figure 3:
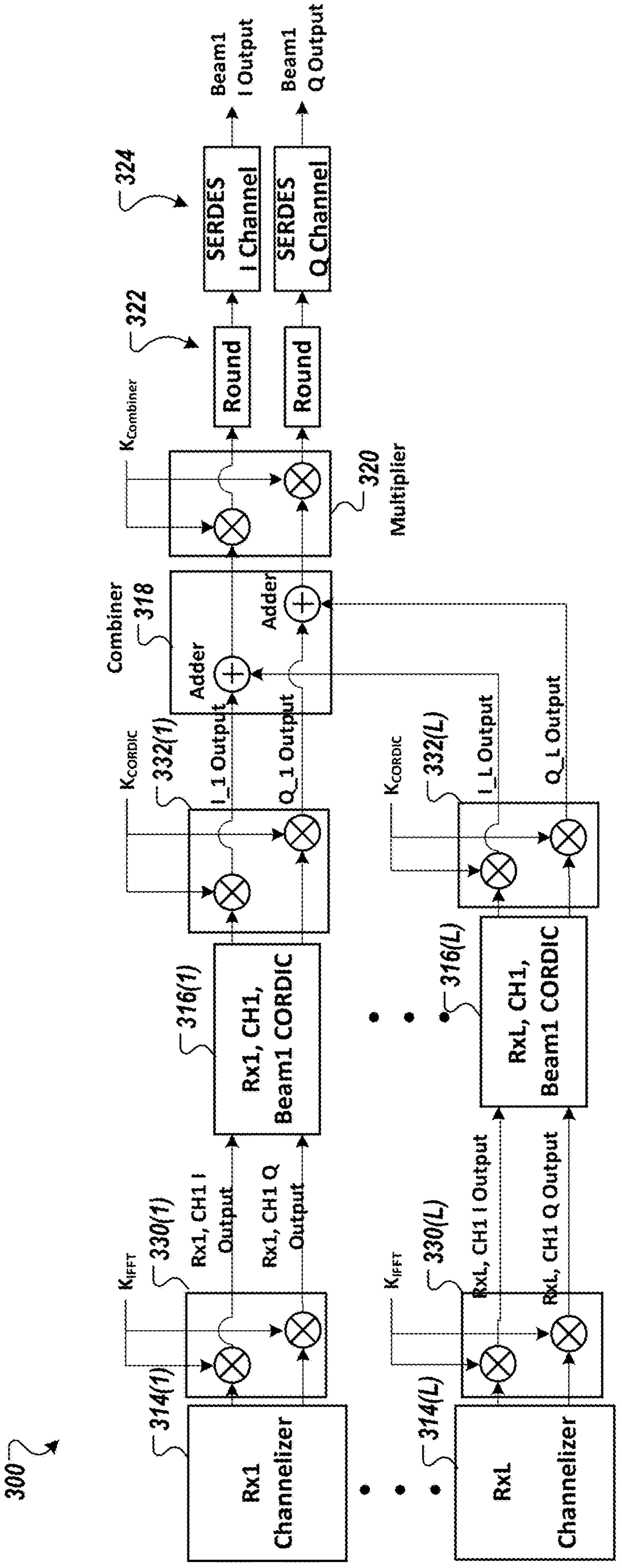
FIG. 3 is a functional diagram of a communication system with DSP blocks with multiple multiplication stages for phase shifting in digital beamforming phased arrays, according to at least one embodiment.

FIG. 3 is a functional diagram of a communication system 300 with DSP blocks with multiple multiplication stages for phase shifting in digital beamforming phased arrays, according to at least one embodiment. Communications system 300 includes a portion of a DBF device with multiple channelizers 314(1)-314(L), multiple CORDIC phase shifters 316(1)-(L), a combiner 318, a multiplier 320, round blocks 322, and SERDES channels 324. The DBF device also includes multiplication stages 330(1)-330(L) in connection with the multiple channelizers 314(1)-314(36), and multiplication stages 332(1)-332(L) in connection with the multiple CORDIC phase shifters 316(1)-(L).

Post channelization, each channel's output data is split and copied M times to generate M independent beams. The process of beamforming includes applying appropriate phase shifts to each copy to align with the received signal beam's direction of arrival. Phase aligned signals are summed with their counterparts from other receive paths within the same DBF in a digital element combiner, combiner 318, to construct one or multiple beams. The number of element combiners per DBF matches the number of independent beams supported by the DBF device. The beamformed data is passed onto SERDES circuitry 324, which serves as a data pipe between adjacent DBF devices and/or modem(s). As described above, SERDES circuitry 324 converts data between serial data and parallel interfaces in each direction. SERDES circuitry 324 can provide data transmission over a single line or a differential pair in order to minimize a number of interconnects between circuits. SERDES circuitry 324 can communicate data with a second DBF device or a modem.

As a result of summation of L (e.g., 36) phase aligned I and Q signals, where L is the number of receiver chains inside the DBF device, the bus width of the combined data increases as set forth in equation (12).

$$\text{Bus Width}_{Combined}=\text{Bus Width}_{Input}+2\times\log_2(L) \quad (12)$$

For example, if a DBF device is connected to 36 antenna elements and contains 36 receiver chains, the data bus width upon summation increases by approximately 12 bits (6 bits for I data and 6 bits for Q data, after rounding up log 2(36)). Increasing the data bus size also increases the required SERDES data rate, hence the overall power consumption rises. To alleviate the need for higher SERDES data rate, the bus size can be reduced by scaling down the signal by multiplying with a pre-determined scaling factor. This scaling also adds an overhead of extra multiplications for each beam's combined data stream.

Given L receiver chains, N frequency channels, and M independent beams per channel in a DBF device, the number of multiplication operations in a traditional complex-multiplier based digital phase shifter implementation, without merging IFFT and element combiner scaling factors, is set forth in equation (13).

$$\text{Number of Multiplications} = L \times [2N + 3(N \times M)] + 2(M \times N) \quad (13)$$

If L=36, N=30, and M=16, Equation 13 results in 54,960 multipliers. The number of multiplications associated with replacing complex-multiplier based digital phase shifters with CORDIC phase shifters 116, without merging CORDIC gain, IFFT and element combiner scaling factors, is expressed in equation (14).

$$\text{Number of Multiplications} = L\times[2N+2(N\times M)]+2(M\times N) \quad (14)$$

In this case, for L=36, N=30, and M=16, Equation 14 results in 37,680 multipliers.

Figure 4:
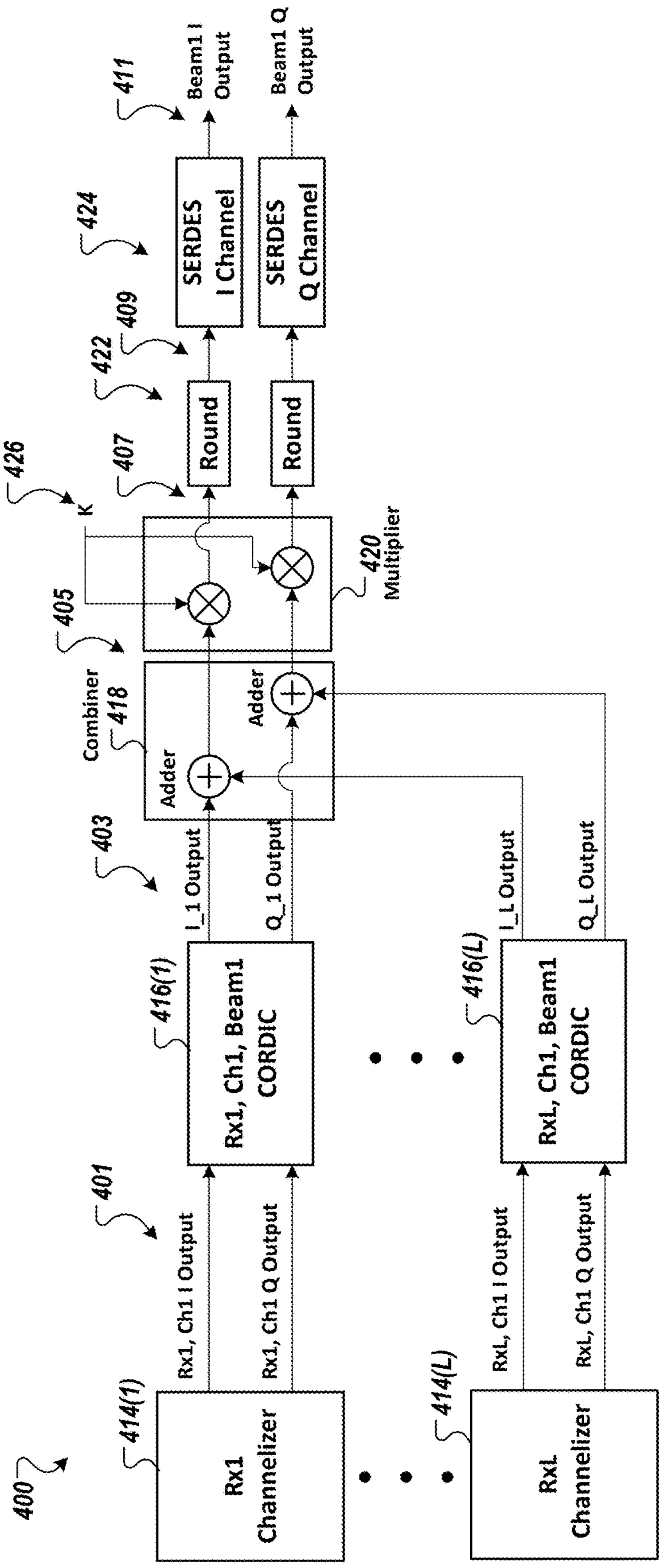
FIG. 4 is a functional diagram of a communication system with DSP blocks with a single multiplication stage for phase shifting in digital beamforming phased arrays, according to at least one embodiment.

In comparison, embodiments described herein overcome the deficiencies of conventional digital beamforming circuits by providing multiplier-less phase shifters for digital phase shifts and by combining IFFT scaling, gain scaling, and element combiner scaling into a single scaling factor, such as illustrated in FIG. 4. This architecture can realize energy efficient digital beamforming by implementing multiplier-less CORDIC phase shifters 416 for digital phase shifts and combining the IFFT scaling, CORDIC gain scaling, and element combiner scaling into a single scaling factor. This architecture is illustrated and described in FIG. 4 for a receive DBF IC that contains 36 receivers and a 45-point IFFT in the channelizers.

As discussed above, the IFFT scaling requires a constant multiplication and it changes the precision if it is truncated or rounded. To preserve this precision and consolidate the multiplication operations in the data path, the IFFT scaling is merged into element combiner 418 since the element combiner 418 also contains scaling logic for data bus width reduction. This cross-functional partition is described in Equation (15) below.

$$x(n)=\sum_{k=0}^{N-1} X(k)\times e^{j\left(\frac{2\pi}{N}\right)nk}\times 2^{-m},\ \text{where } 0\le n<L \text{ and } m=\log_2(L) \quad (15)$$

Upon combining the element combiner-scaling factor with the IFFT scaling factor, the element combiner 418 will have a new constant scaling factor $K_{IF}$FT as described in Equation (16) below.

$$K_{IFFT}=\frac{2^m}{N} \quad (16)$$

A regular CORDIC phase shifter involves a gain scaling to align input and output power. However, a CORDIC phase shifter can be realized without any gain scaling and the required CORDIC gain scaling is merged with the element combiner-scaling factor. Therefore, element combiner will have another constant scaling $K_{CORDIC}$ as part of its overall scaling.

$$K_{CORDIC}=\frac{1}{1.647} \quad (17)$$

The final element combiner scaling for each beam is then derived from $K_{IFFT}$ and $K_{CORDIC}$.

$$Y_{combined}(n)=K_{IFFT}\times K_{CORDIC}\sum_{k=0}^{L-1}X_k(n) \quad (18)$$

For L receiver chains, N frequency channels, and M independent beams per channel in a DBF, the number of multiplication operations is reduced to two times the number of independent beams, as expressed in equation (19).

$$\text{Number of Multiplications}=2(M\times N) \quad (19)$$

In other words, the CORDIC gain and the IFFT scaling multipliers have been completely eliminated. For example, Equation 19 for 30 channels and 16 beams results in a total of 960 multipliers regardless of the number receiver chains and antenna elements, which is a significant reduction in both power and area of the DBF beamforming algorithm.

FIG. 4 is a functional diagram of a communication system 400 with DSP blocks with a single multiplication stage for phase shifting in digital beamforming phased arrays according to at least one embodiment. In general, communication system 400 is for a single beam digital beamforming for one channel (channel 1) out of each N-channel channelizers 414(1)-414(L), each corresponding to one of the N RX chains (N antenna elements). Each output 401 of each N-channel channelizers 414(1)-414(L) is phase aligned with each of the CORDIC phase shifters 416(1)-416(L), respectively. Each output 403 of each CORDIC phase shifters 416(1)-416(L) are summed by combiner 418 (also referred to as digital element combiner or element combiner). That is, after phase shifting, the output 403 of each RX channel is summed in the element combiner to create a beam. Multiplier 420 multiplies output 405 of combiner 418 by a constant multiplier value 426. The combined data is then passed onto SERDES circuitry 424. As illustrated in FIG. 4, in one embodiment, output 407 of multiplier 420 can be rounded by round blocks 422. Outputs 409 of round block 422 can be passed to SERDES circuitry 424. SERDES circuitry 424 converts data between serial data and parallel interfaces in each direction. SERDES circuitry 424 can provide data transmission over a single line or a differential pair in order to minimize a number of interconnects between circuits. SERDES circuitry 424 can communicate data with a second DBF device or a modem.

FIG. 4 highlights the elimination of the IFFT scaling factors and CORDIC scaling factors. Only one scaling factor is applied per beam at the output 405 of the element combiner 418, regardless of the number of receiver chains.

As illustrated in FIG. 4, DSP blocks of communication system 400 can process an in-phase component and a quadrature component of digital data separately. That is, in one embodiment, outputs 401 include first data output by a first channelizer, the first data including a first in-phase value and a first quadrature value. Quadrature signals (also referred to as IQ samples, IQ signals, or IQ data) are used in RF systems and form the basis of complex RF signal modulation and demodulation. The in-phase (or reference) signal is referred to as "I" and the signal that is shifted by 90 degrees (signal in quadrature) is called "Q." The in-phase value can be considered the in-phase component of a signal and the quadrature value can be considered the quadrature component of a signal. The in-phase value and the quadrature value can make up an IQ sample, which can be represented as a coordinate in a constellation diagram, where I and Q correspond to an amplitude and a phase for a signal on the constellation diagram. In some embodiments phase signal and the quadrature signal can have the same frequency and in some embodiments the amplitudes may be equal. Outputs 403 include second data output by a first CORDIC phase shifter, the second data includes a second in-phase value and a second quadrature value. The second in-phase value is phase shifted from the first in-phase value by the first CORDIC phase shifter according to a coefficient value stored for a respective antenna element and the second quadrature value being phase shifted from the first quadrature value by the first phase shifter, according to the coefficient value. Output 405 includes a third in-phase value, which is output by a first adder of combiner 418 and a third quadrature value, which is output by a second adder of combiner 418. Third in-phase value is a sum of all of the in-phase values from the CORDIC phase shifters. Third quadrature value is a sum of all of the quadrature values from the CORDIC phase shifters. Output 407 includes a fourth in-phase value, which is output by a first multiplier of multiplier 420 and a fourth quadrature value, which is output by a second multiplier of multiplier 420. Fourth in-phase value represents a product of the third in-phase value and constant multiplier value 426. Fourth quadrature value represents a product of the third quadrature value and constant multiplier value 426. Output 409 includes a fifth in-phase value, which is output by a first round block and a fifth quadrature value, which is output by a second round block. Fifth in-phase value is the fourth in-phase value after rounding. Fifth quadrature value is fourth quadrature value after rounding. A first SERDES channel outputs digital data corresponding to an in-phase component and a second SERDES channel outputs digital data corresponding to a quadrature component.

Figure 5:
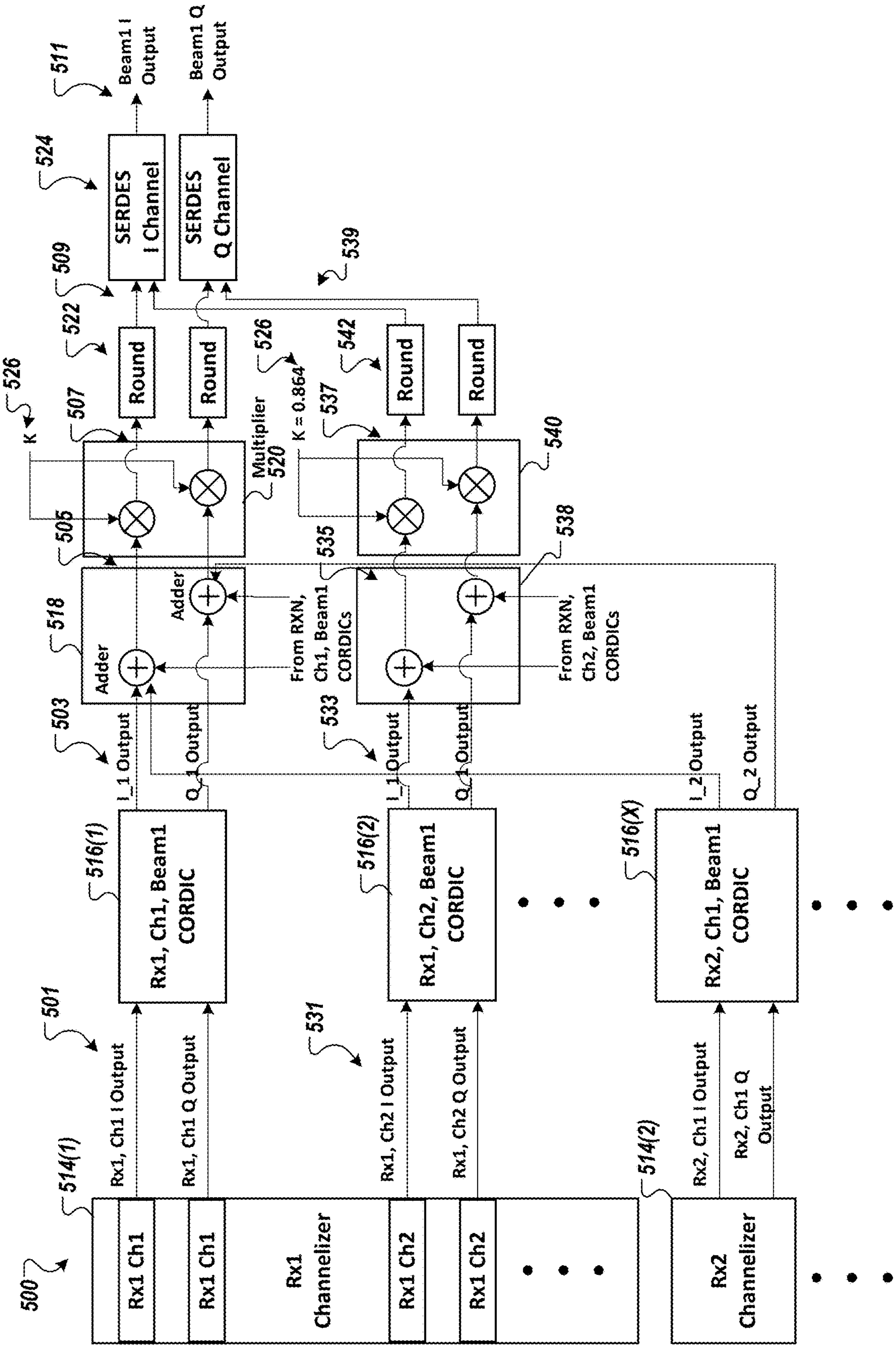
FIG. 5 is a functional diagram of a communication system with DSP blocks with a single multiplication stage for phase shifting in digital beamforming phased arrays, according to at least one embodiment.

FIG. 5 is a functional diagram of a communication system 500 with DSP blocks with a single multiplication stage for phase shifting in digital beamforming phased arrays according to at least one embodiment. Communication system 500 is similar to communication system 400 as noted by similar reference numbers. The first N-channel channelizer 514(1) illustrates two channels (channel 1 and channel 2). First CORDIC phase shifter 516(1) receives first data 501 from first channelizer 514(1) associated with a first channel and outputs second data 503 to combiner 518. Second CORDIC phase shifter 516(2) receives additional data 531 from first channelizer 514(1) associated with a second channel and outputs additional data 533 to a second combiner 538.

As described above with respect to FIG. 4, combiner 518 receives data from each of the CORDIC phase shifters for the first channel. As illustrated in FIG. 4, second channelizer 514(2) sends output to CORDIC phase shifter 516(X) and CORDIC phase shifter 516(X) sends output to combiner 518. Second combiner 538 receives data from each of the CORDIC phase shifters for the second channel. Combiner 518 outputs third data 505 to multiplier 520 that multiplies third data 505 by constant multiplier value 526. Second combiner 538 outputs additional data 535 to second multiplier 540 that multiplies additional data 535 by constant multiplier value 526. Round blocks 522 round output 507 of combiner 518 and passes output 509 to SERDES circuitry 524 for the first channel. Round blocks 542 round output 537 of second combiner 538 and passes output 539 to SERDES circuitry 524. SERDES circuitry 524 converts data between serial data and parallel interfaces in each direction. SERDES circuitry 524 can provide data transmission over a single line or a differential pair in order to minimize a number of interconnects between circuits. SERDES circuitry 524 can communicate data with a second DBF device or a modem.

In another embodiment, DSP circuitry can include a first channelizer, a second channelizer, a first phase shifter, a second phase shifter, a third phase shifter, and a fourth phase shifter, a first combiner, a second combiner, a first multiplier, and a second multiplier. The first channelizer generates the first data associated with a first channel. As described below, first channelizer can also generate seventh data associated with a second channel, as well as additional channels for each additional channel. The second channelizer generates the third data for the first channel. Similarly, the second channelizer can generate eighth data for the second channel, as well as additional channels for each additional channel. The first phase shifter phase shifts first data to second data. The second phase shifter phase shifts third data to fourth data. The second data corresponds to a first antenna element and the fourth data corresponds to a second antenna element. The combiner generates fifth data by adding the second data and the fourth data and the multiplier generates sixth data by multiplying the fifth data by a constant multiplier value. A third phase shifter phase shifts the seventh data to ninth data and a fourth phase shifter phase shifts the eighth data to tenth data. The ninth data corresponds to the first antenna element and the second channel and the tenth data corresponds to the second antenna element and the second channel. The second combiner generates eleventh data by adding the ninth data and the tenth data and the second multiplier generates twelfth data by multiplying the eleventh data by the constant multiplier value.

In another embodiment, the first channelizer is a first N-point channelizer that outputs a first set of N output values, where N is a positive integer that represents a number of channels and the second channelizer is a second N-point channelizer that outputs a second set of N output values. A set of combiners can be used, where each combiner adds one of the first set of N outputs and one of the second set of N outputs and outputs a set of output values. A set of multipliers can also be used where each multiplier multiplies one of the set of output values by the constant multiplier value.

Figure 6:
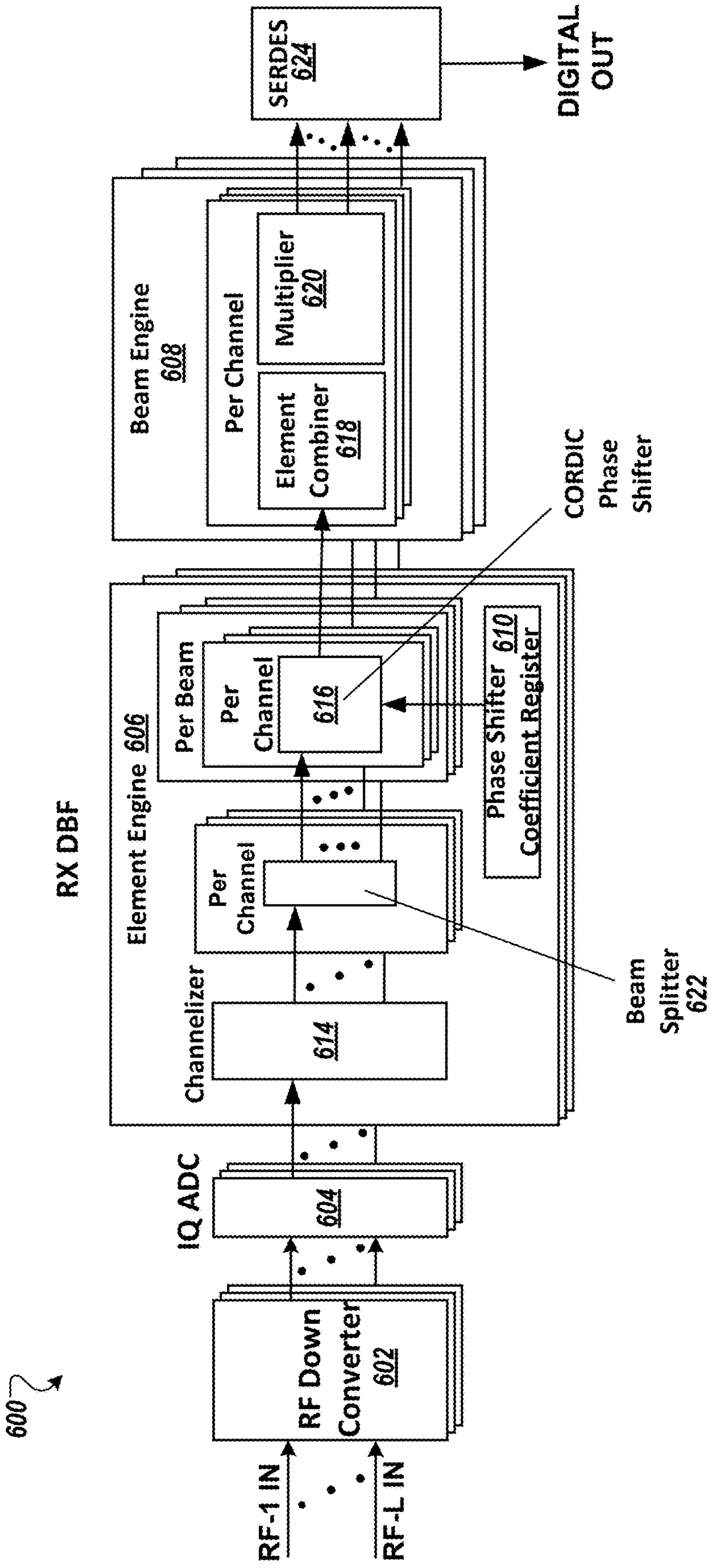
FIG. 6 is a block diagram of a receiver digital beamforming (Rx DBF) device with multi-beam, multi-channel functionality, according to at least one embodiment.

FIG. 6 is a block diagram of a receiver digital beamforming (Rx DBF) device 600 with multi-beam, multi-channel functionality, according to at least one embodiment. Rx DBF device 600 is coupled to an array antenna with multiple antenna elements, which each receive portions of a signal beam. In this embodiment, Rx DBF device 600 is coupled to 36 antenna elements. Alternatively, Rx DBF device 600 is coupled to L antenna elements as described herein. Rx DBF device 600 includes RF down converters 602 that each receives an RX signal from one of the antenna elements. The RF down converter 402 receives an input RF signal and converts the signal in preparation for sampling. Rx DBF device 600 includes analog to digital converters (ADC) 604 that each receives a down-converted RF signal from one of the RF down converters 602. ADC 604 can be in-phase and quadrature (IQ) ADC that converts the down converted signal into a digital signal, including an in-phase (I) component and a (Q) quadrature component. In some embodiments, the ADC 604 generates samples that are not necessarily IQ samples. For example, the ADC may generate samples using quadrature phase shift keying (QPSK). The RF down converter 602 and IQ ADC 604 can be circuits that are integrated in the Rx DBF device 600 or can be external circuits to a digital signal processor with the digital processing blocks, as described herein. In some embodiments, an ADC 604 may be coupled to one or more RF down converters 602, corresponding to one or more antenna elements. For example, Rx DBF device 600 may include multiple ADCs 604 each coupled to a subset of the antenna elements to convert different subbeams of an incoming signal. In another example, Rx DBF device 600 may include one ADC 604 for the entire Rx DBF device 600. The ADC 604 can be a processing element of Rx DBF device 600, such as a discrete component, a discrete circuit, logic circuitry, a digital functional block, a programmable block, such as a DSP functional block, or the like. The ADC 604 can generate samples for various subbeams of the signal beam received by antenna elements.

As shown in FIG. 6, Rx DBF device 600 may further include an element engine 606 that includes phase shifters 616 coupled to the ADC 604 and a phase shifter coefficient register 610 coupled to the phase shifters 616. The phase shifter coefficient register 610 stores data (e.g. register values) associated with phase shift quantities for each phase shifter 616. The phase shifters 616 receive the converted digital subbeams from the ADC 604 and apply a phase shift. Each phase shifter 616 applies a phase shift to a received digital subbeam corresponding to the data stored in an associated phase shifter coefficient register 610. In some embodiments, the values stored in the phase shifter coefficient register 610 are associated with the spatial location of the antenna elements that received the subbeams that the phase shifters 616 are processing. For example, a phase shifter 616 may apply a larger phase shift to a digital signal that is received by an antenna element located near the boundary of an array antenna formed by the antenna elements than a digital signal that is received by an antenna element located near the center of the array antenna. In some embodiments, the phase shifter coefficient register 610 maps phase shift values to the phase shifters 616 such that the resulting phase compensated digital signals are in phase with each other. The phase shifters 616 and phase shifter coefficient registers 610 can be processing elements of Rx DBF device 600, such as a discrete component, a discrete circuit, logic circuitry, a digital functional block, a programmable block, such as a DSP functional block, or the like.

As shown in FIG. 6, Rx DBF device 600 further includes an element combiner 612 coupled to the phase shifters 616 and a multiplier 620 coupled to the element combiner 612. The element combiner 612 receives the phase compensated signals from the phase shifter 616 and combines the signals together. In some embodiments, Rx DBF device 600 includes multiple element combiners 612 to add portions of the phase compensated signals together. For example, each element combiner 612 may aggregate signals associated with antenna elements located in close proximity on the array antenna. The multiplier 620 multiplies the combined signal by a constant multiplier value, as described herein with respect to multiplier 420 of FIG. 4 and multipliers 520, 540 of FIG. 5. The constant multiplier value can be stored in a register or other memory element.

As shown in FIG. 6, Rx DBF device 600 further includes SERDES circuitry 624 that receives data from the multiplier 620. SERDES circuitry 624 converts data between serial data and parallel interfaces in each direction. SERDES circuitry 624 can provide data transmission over a single line or a differential pair in order to minimize a number of interconnects between circuits. SERDES circuitry 624 can communicate data with a second DBF device or a modem. The DBF device can output the signal for further downstream processing, such as by another DBF, a modem, a host system, or the like. In some embodiments a DBF combiner (separate from element combiner 618) may receive processed signals from other DBF devices to combine with a signal from the current DBF device. The DBF combiner may send the combined signal to another DBF device for further processing. The DBF combiner can be a processing element of Rx DBF device 600, such as a discrete component, a discrete circuit, logic circuitry, a digital functional block, a programmable block, such as a DSP functional block, or the like.

Although the description above describes phase shifters 616, element combiner 618, and multiplier 620 as one path from multiple antenna elements to a single multiplier 620, Rx DBF device 600 can be scaled for multiple channels, for multiple beams, or both. As illustrated in FIG. 6, Rx DBF device 600 can also include multiple element engines 606 and multiple beam engines 608. Each element engine 606 includes a channelizer 614. Channelizer 614 performs a channelizing function. In some embodiments, the input signal received by Rx DBF device 600 is a broadband signal comprising multiple subbeams of various frequencies and signal modulations. For example, channelizer 614 can divide a broadband signal beam into subbeams and organize the subbeams into channels based on the frequency of each subbeams. In another example, channelizer 614 can divide a signal into multiple channels based on signal modulations. Signal modulations can include indicators of sources of the received signal by the channelizer. For, example a subbeam of the input signal beam may include a signal modulation that identifies a remote device as the source of the transmitted subbeam. Alternatively, the channelizer 614 can divide the incoming signal into various channels based on predetermined criteria of the incoming signal beam. Channelizer 614 can be an N-channel channelizer that receives signals from the ADCs 604, where N represents a number of channels being used by Rx DBF device 600. Channelizer 614 can operate in a similar manner as channelizers 414 of FIG. 4, and channelizers 514 of FIG. 5.

In other embodiments, an amplitude (AM) taper can be coupled to channelizer 614 and can apply an amplitude shaping function to the signal in each channel. In some embodiments, the AM taper applies a weighting function to adjust the amplitude of the signal of each channel. For example, the AM taper may apply an amplitude shaping function to reduce the side lobe levels of the signal of each channel and increase the main lobe beamwidth of the signal of each channel. In another example, the AM taper may provide an amplitude shaping function to improve the directivity of the signal from the array antenna.

In some embodiments, each element engine 606 can include a beam splitter 622 for each channel created by channelizer 614. Beam splitter 622 can split the signal of each channel into primary beams and subbeams within each primary beam. In some embodiments, each primary beam and corresponding subbeams may be associated with a different input source (e.g. user device, remote server, wireless communication device, etc.) of the input signal received by Rx DBF device 600. The channelizer 614, AM taper, and beam splitter 622 can be processing elements of the element engine 606, such as a discrete component, a discrete circuit, logic circuitry, a digital functional block, a programmable block, such as a DSP functional block, or the like. During operation, beam splitter 622 generates data for a respective beam on a per channel basis.

As illustrated in FIG. 6, each element engine 606 includes a phase shifter 616 (e.g., CORDIC phase shifter) per channel. In addition, because beam splitter 622 splits the signal into M beams, there are multiple channels for each beam, each channel including a respective phase shifter 616. That is, there can be a phase shifter 616 for each subbeam of each of the primary beams, where each phase shifter 616 is coupled to beam splitter 622. Each phase shifter 616 is coupled to the phase shifter coefficient register 610. The phase shifter coefficient register 610 includes data (e.g. register values) associated with the amount of phase delay an associated phase shifter 616 applies to a subbeam. In some embodiments, the phase shifter coefficient register 610 receives data from a processing device that coordinates the relative phase shift of each phase shifter 616 across each primary beam and associated subbeams. For example, the phase shifter coefficient register 610 may store mapped data corresponding to a specific phase shift to be applied by an associated phase shifter 616 that results in each phase compensated signal being in phase with each other. The phase shifters 616 and phase shifter coefficient register 610 can be a processing element of the element engine 606, such as a discrete component, a discrete circuit, logic circuitry, a digital functional block, a programmable block, such as a DSP functional block, or the like.

As illustrated in FIG. 6, each beam engine 608 includes, on a per channel basis, a respective element combiner 618 and multiplier 620. Each beam engine 608 outputs data to SERDES circuitry 624.

In another embodiment, Rx DBF device 600 includes a set of L receiver chains, a set of L transmitter chains, a set of L ADCs, a set of L element engines, a set of M beam engines, and SERDES circuitry 624, where L is a positive integer representing a first number of antenna elements of an array antenna and M is a positive integer representing a second number of beams. Each of the L receiver chains includes RF down converter circuitry 602. Each of the set of L transmitter chains includes RF up converter circuitry. Each element engine 606 of the set of L element engines includes a CORDIC phase shifter 616 and each beam engine 608 of the set of M beam engines includes an element combiner 618 and a multiplier 620.

In at least one embodiment, a first phase shifter 616 receives a first in-phase value and a first quadrature value for first data and generates a second in-phase value and a second quadrature value for second data. A second phase shifter 616 receives a third in-phase value and third quadrature value for third data and generates a fourth in-phase value and a fourth quadrature value for fourth data. Combiner 618 includes a first adder and a second adder. The first adder adds the second in-phase value and the fourth in-phase value to obtain a fifth in-phase value for fifth data. The second adder adds the second quadrature value and the fourth quadrature value to obtain a fifth quadrature value for the fifth data. Multiplier 620 generates a sixth in-phase value for sixth data by multiplying the fifth in-phase value by the constant multiplier value. Multiplier 620 generates a sixth quadrature value for the sixth data by multiplying the fifth quadrature value by the constant multiplier value.

In another embodiment, beam engine 608 includes one or more round functions. For example, a first round function can round the sixth in-phase value and a second round function can round the sixth quadrature value, before being output to SERDES circuitry 624. SERDES circuitry 624 outputs the sixth in-phase value and the sixth quadrature value to a second DBF device or a modem, as described herein.

Figure 7:
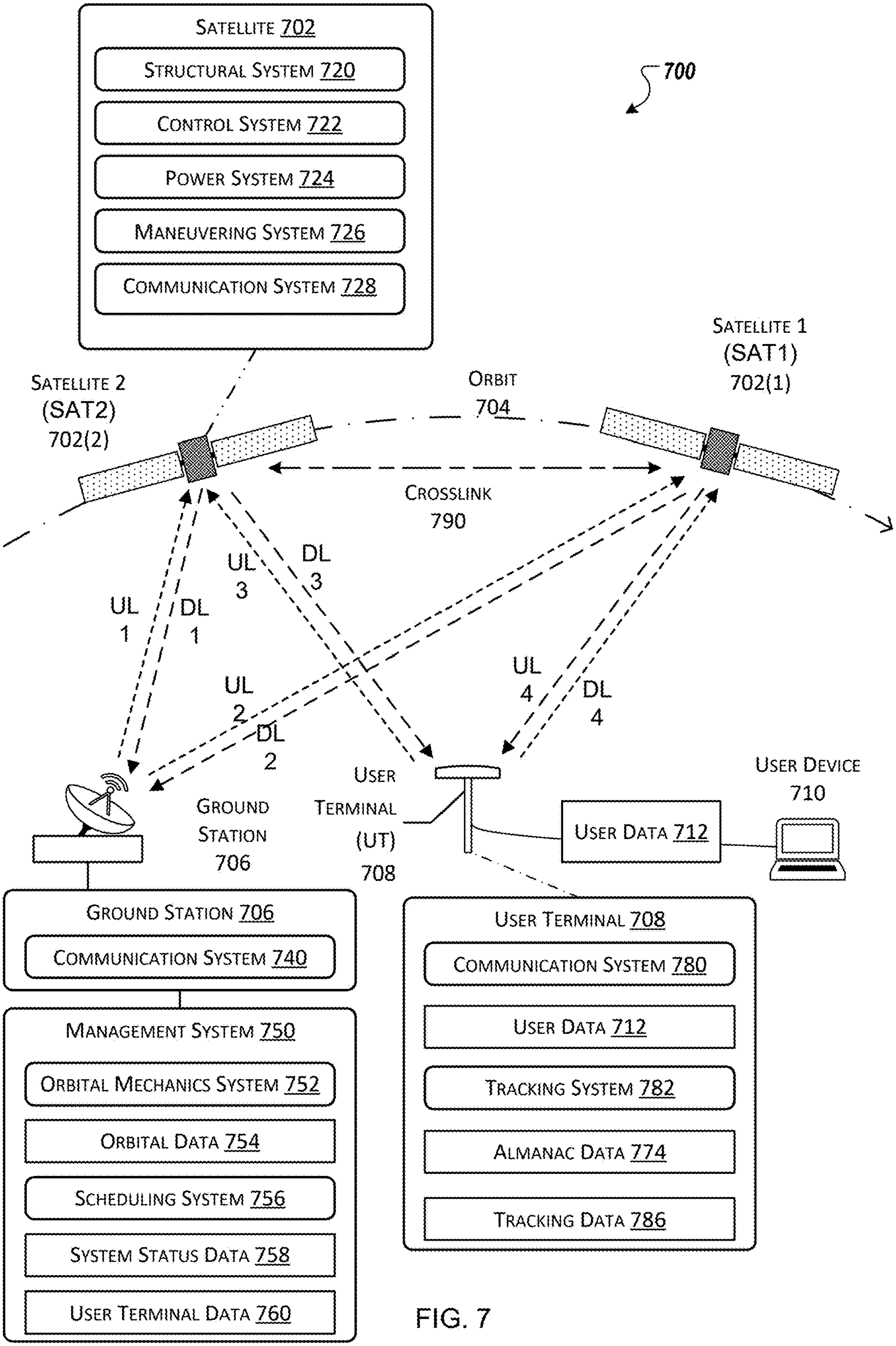
FIG. 7 illustrates a portion of a communication system that includes two satellites of a constellation of satellites, each satellite being in orbit, according to embodiments of the present disclosure.

FIG. 7 illustrates a portion of a communication system 700 that includes two satellites of a constellation of satellites 702(1), 702(2), . . . , 702(S), each satellite 702 being in orbit 704 according to embodiments of the present disclosure. The system 700 shown here comprises a plurality (or "constellation") of satellites 702(1), 702(2), . . . , 702(S), each satellite 702 being in orbit 704. Any of the satellites 702 can include the communication system 100, 300, 400, or 500 of FIGS. 1, 3, 4, and 5 as well as Rx DBF device 600. Also shown is a ground station 706, user terminal (UT) 708, and a user device 710.

The constellation may comprise hundreds or thousands of satellites 702, in various orbits 704. For example, one or more of these satellites 702 may be in non-geosynchronous orbits (NGOs) in which they are in constant motion with respect to the Earth. For example, the orbit 704 is a low earth orbit (LEO). In this illustration, orbit 704 is depicted with an arc pointed to the right. A first satellite (SAT1) 702(1) is leading (ahead of) a second satellite (SAT2) 702(2) in the orbit 704.

The satellite 702 may comprise a structural system 720, a control system 722, a power system 724, a maneuvering system 726, and a communication system 728 described herein. In other implementations, some systems may be omitted or other systems added. One or more of these systems may be communicatively coupled with one another in various combinations.

The structural system 720 comprises one or more structural elements to support operation of the satellite 702. For example, the structural system 720 may include trusses, struts, panels, and so forth. The components of other systems may be affixed to, or housed by, the structural system 720. For example, the structural system 720 may provide mechanical mounting and support for solar panels in the power system 724. The structural system 720 may also provide for thermal control to maintain components of the satellite 702 within operational temperature ranges. For example, the structural system 720 may include louvers, heat sinks, radiators, and so forth.

The control system 722 provides various services, such as operating the onboard systems, resource management, providing telemetry, processing commands, and so forth. For example, the control system 722 may direct operation of the communication system 728.

The power system 724 provides electrical power for operation of the components onboard the satellite 702. The power system 724 may include components to generate electrical energy. For example, the power system 724 may comprise one or more photovoltaic cells, thermoelectric devices, fuel cells, and so forth. The power system 724 may include components to store electrical energy. For example, the power system 724 may comprise one or more batteries, fuel cells, and so forth.

The maneuvering system 726 maintains the satellite 702 in one or more of a specified orientation or orbit 704. For example, the maneuvering system 726 may stabilize the satellite 702 with respect to one or more axis. In another example, the maneuvering system 726 may move the satellite 702 to a specified orbit 704. The maneuvering system 726 may include one or more computing devices, sensors, thrusters, momentum wheels, solar sails, drag devices, and so forth. For example, the sensors of the maneuvering system 726 may include one or more global navigation satellite system (GNSS) receivers, such as global positioning system (GPS) receivers, to provide information about the position and orientation of the satellite 702 relative to Earth. In another example, the sensors of the maneuvering system 726 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 728 provides communication with one or more other devices, such as other satellites 702, ground stations 706, user terminals 708, and so forth. The communication system 728 may include one or more modems, digital signal processors, power amplifiers, antennas (including at least one antenna that implements multiple antenna elements, such as a phased array antenna, and including an embedded calibration antenna, such as the calibration antenna 704 as described herein), processors, memories, storage devices, communications peripherals, interface buses, and so forth. Such components support communications with other satellites 702, ground stations 706, user terminals 708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 728 may be output to other systems, such as to the control system 722, for further processing. Output from a system, such as the control system 722, may be provided to the communication system 728 for transmission.

One or more ground stations 706 are in communication with one or more satellites 702. The ground stations 706 may pass data between the satellites 702, a management system 750, networks such as the Internet, and so forth. The ground stations 706 may be emplaced on land, on vehicles, at sea, and so forth. Each ground station 706 may comprise a communication system 740. Each ground station 706 may use the communication system 740 to establish communication with one or more satellites 702, other ground stations 706, and so forth. The ground station 706 may also be connected to one or more communication networks. For example, the ground station 706 may connect to a terrestrial fiber optic communication network. The ground station 706 may act as a network gateway, passing user data 712 or other data between the one or more communication networks and the satellites 702. Such data may be processed by the ground station 706 and communicated via the communication system 740. The communication system 740 of a ground station may include components similar to those of the communication system 728 of a satellite 702 and may perform similar communication functionalities. For example, the communication system 740 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 706 are in communication with a management system 750. The management system 750 is also in communication, via the ground stations 706, with the satellites 702 and the UTs 708. The management system 750 coordinates operation of the satellites 702, ground stations 706, UTs 708, and other resources of the system 700. The management system 750 may comprise one or more of an orbital mechanics system 752 or a scheduling system 756. In some embodiments, the scheduling system 756 can operate in conjunction with an HD controller.

The orbital mechanics system 752 determines orbital data 754 that is indicative of a state of a particular satellite 702 at a specified time. In one implementation, the orbital mechanics system 752 may use orbital elements that represent characteristics of the orbit 704 of the satellites 702 in the constellation to determine the orbital data 754 that predicts location, velocity, and so forth of particular satellites 702 at particular times or time intervals. For example, the orbital mechanics system 752 may use data obtained from actual observations from tracking stations, data from the satellites 702, scheduled maneuvers, and so forth to determine the orbital elements. The orbital mechanics system 752 may also consider other data, such as space weather, collision mitigation, orbital elements of known debris, and so forth.

The scheduling system 756 schedules resources to provide communication to the UTs 708. For example, the scheduling system 756 may determine handover data that indicates when communication is to be transferred from the first satellite 702(1) to the second satellite 702(2). Continuing the example, the scheduling system 756 may also specify communication parameters such as frequency, timeslot, and so forth. During operation, the scheduling system 756 may use information such as the orbital data 754, system status data 758, user terminal data 760, and so forth.

The system status data 758 may comprise information such as which UTs 708 are currently transferring data, satellite availability, current satellites 702 in use by respective UTs 708, capacity available at particular ground stations 706, and so forth. For example, the satellite availability may comprise information indicative of satellites 702 that are available to provide communication service or those satellites 702 that are unavailable for communication service. Continuing the example, a satellite 702 may be unavailable due to malfunction, previous tasking, maneuvering, and so forth. The system status data 758 may be indicative of past status, predictions of future status, and so forth. For example, the system status data 758 may include information such as projected data traffic for a specified interval of time based on previous transfers of user data 712. In another example, the system status data 758 may be indicative of future status, such as a satellite 702 being unavailable to provide communication service due to scheduled maneuvering, scheduled maintenance, scheduled decommissioning, and so forth.

The user terminal data 760 may comprise information such a location of a particular UT 708. The user terminal data 760 may also include other information such as a priority assigned to user data 712 associated with that UT 708, information about the communication capabilities of that particular UT 708, and so forth. For example, a particular UT 708 in use by a business may be assigned a higher priority relative to a UT 708 operated in a residential setting. Over time, different versions of UTs 708 may be deployed, having different communication capabilities such as being able to operate at particular frequencies, supporting different signal encoding schemes, having different antenna configurations, and so forth.

The UT 708 includes a communication system 780 to establish communication with one or more satellites 702. The communication system 780 of the UT 708 may include components similar to those of the communication system 728 of a satellite 702 and may perform similar communication functionalities. For example, the communication system 780 may include one or more modems, digital signal processors, power amplifiers, antennas (including at least one antenna that implements multiple antenna elements, such as a phased array antenna), processors, memories, storage devices, communications peripherals, interface buses, and so forth. The UT 708 passes user data 712 between the constellation of satellites 702 and the user device 710. The user data 712 includes data originated by the user device 710 or addressed to the user device 710. The UT 708 may be fixed or in motion. For example, the UT 708 may be used at a residence, or on a vehicle such as a car, boat, aerostat, drone, airplane, and so forth.

The UT 708 includes a tracking system 782. The tracking system 782 uses almanac data 784 to determine tracking data 786. The almanac data 784 provides information indicative of orbital elements of the orbit 704 of one or more satellites 702. For example, the almanac data 784 may comprise orbital elements such as "two-line element" data for the satellites 702 in the constellation that are broadcast or otherwise sent to the UTs 708 using the communication system 780.

The tracking system 782 may use the current location of the UT 708 and the almanac data 784 to determine the tracking data 786 for the satellite 702. For example, based on the current location of the UT 708 and the predicted position and movement of the satellites 702, the tracking system 782 is able to calculate the tracking data 786. The tracking data 786 may include information indicative of azimuth, elevation, distance to the second satellite, time of flight correction, or other information at a specified time. The determination of the tracking data 786 may be ongoing. For example, the first UT 708 may determine tracking data 786 every 700 ms, every second, every five seconds, or at other intervals.

With regard to FIG. 7, an uplink is a communication link which allows data to be sent to a satellite 702 from a ground station 706, UT 708, or device other than another satellite 702. Uplinks are designated as UL1, UL2, UL3 and so forth. For example, UL1 is a first uplink from the ground station 706 to the second satellite 702(2). In comparison, a downlink is a communication link which allows data to be sent from the satellite 702 to a ground station 706, UT 708, or device other than another satellite 702. For example, DL1 is a first downlink from the second satellite 702(2) to the ground station 706. The satellites 702 may also be in communication with one another. For example, a crosslink 790 provides for communication between satellites 702 in the constellation.

The satellite 702, the ground station 706, the user terminal 708, the user device 710, the management system 750, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 8:
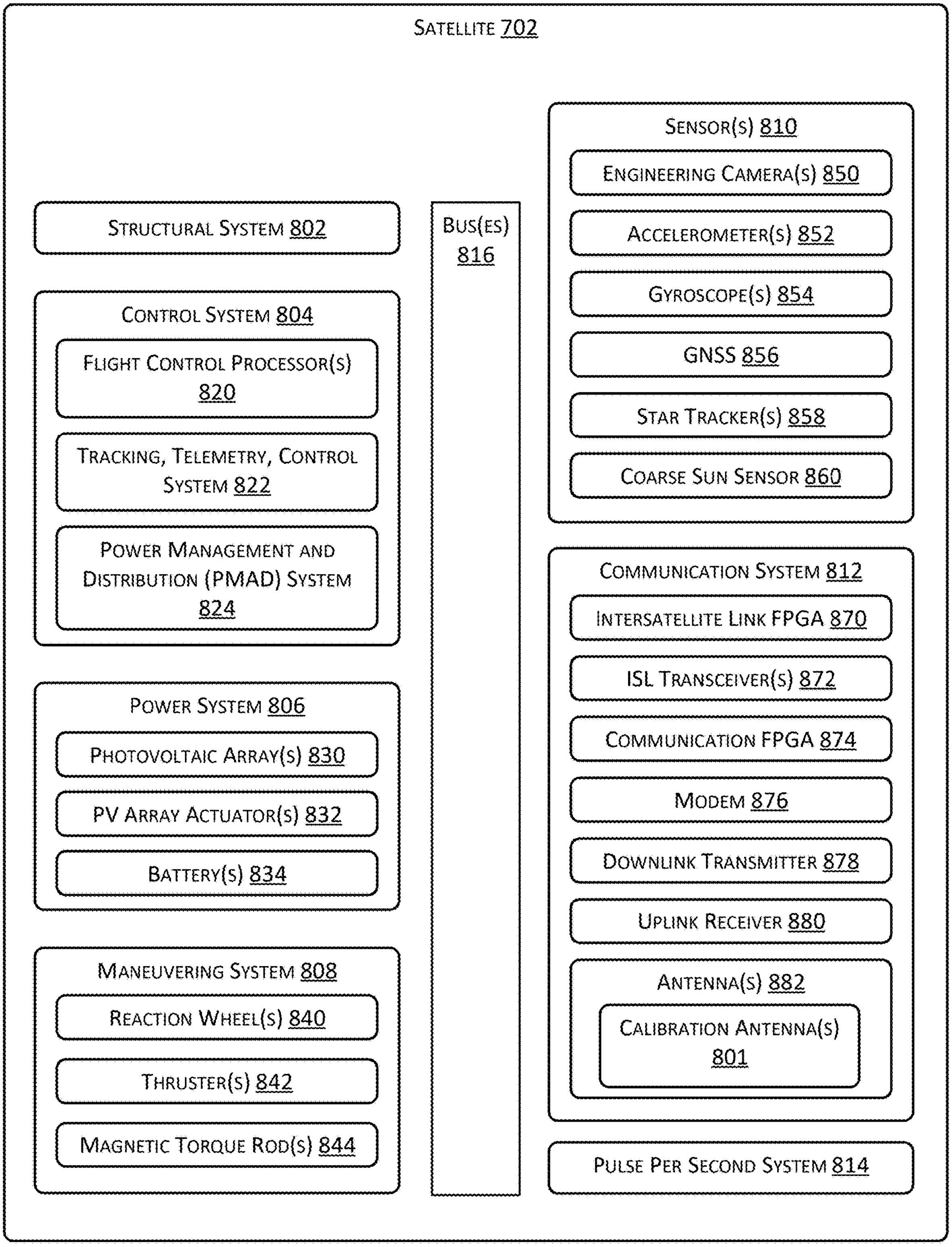
FIG. 8 is a functional block diagram of some systems associated with the satellite, according to some implementations.

FIG. 8 is a functional block diagram of some systems associated with the satellite 702, according to some implementations. The satellite 702 may comprise a structural system 802, a control system 804, a power system 806, a maneuvering system 808, one or more sensors 810, and a communication system 812. A pulse per second (PPS) system 814 may be used to provide timing reference to the systems onboard the satellite 702. One or more busses 816 may be used to transfer data between the systems onboard the satellite 702. In some implementations, redundant busses 816 may be provided. The busses 816 may include, but are not limited to, data busses such as Controller Area Network Flexible Data Rate (CAN FD), Ethernet, Serial Peripheral Interface (SPI), and so forth. In some implementations the busses 816 may carry other signals. For example, a radio frequency bus may comprise coaxial cable, waveguides, and so forth to transfer radio signals from one part of the satellite 702 to another. In other implementations, some systems may be omitted or other systems added. One or more of these systems may be communicatively coupled with one another in various combinations.

The structural system 802 comprises one or more structural elements to support operation of the satellite 702. For example, the structural system 802 may include trusses, struts, panels, and so forth. The components of other systems may be affixed to, or housed by, the structural system 802. For example, the structural system 802 may provide mechanical mounting and support for solar panels in the power system 806. The structural system 802 may also provide for thermal control to maintain components of the satellite 702 within operational temperature ranges. For example, the structural system 802 may include louvers, heat sinks, radiators, and so forth.

The control system 804 provides various services, such as operating the onboard systems, resource management, providing telemetry, processing commands, and so forth. For example, the control system 804 may direct operation of the communication system 812. The control system 804 may include one or more flight control processors 820. The flight control processors 820 may comprise one or more processors, FPGAs, and so forth. A tracking, telemetry, and control (TTC) system 822 may include one or more processors, radios, and so forth. For example, the TTC system 822 may comprise a dedicated radio transmitter and receiver to receive commands from a ground station 706, send telemetry to the ground station 706, and so forth. A power management and distribution (PMAD) system 824 may direct operation of the power system 806, control distribution of power to the systems of the satellite 702, control battery 834 charging, and so forth.

The power system 806 provides electrical power for operation of the components onboard the satellite 702. The power system 806 may include components to generate electrical energy. For example, the power system 806 may comprise one or more photovoltaic arrays 830 comprising a plurality of photovoltaic cells, thermoelectric devices, fuel cells, and so forth. One or more PV array actuators 832 may be used to change the orientation of the photovoltaic array(s) 830 relative to the satellite 702. For example, the PV array actuator 832 may comprise a motor. The power system 806 may include components to store electrical energy. For example, the power system 806 may comprise one or more batteries 834, fuel cells, and so forth.

The maneuvering system 808 maintains the satellite 702 in one or more of a specified orientation or orbit 704. For example, the maneuvering system 808 may stabilize the satellite 702 with respect to one or more axes. In another example, the maneuvering system 808 may move the satellite 702 to a specified orbit 704. The maneuvering system 808 may include one or more of reaction wheel(s) 840, thrusters 842, magnetic torque rods 844, solar sails, drag devices, and so forth. The thrusters 842 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 806 to expel the water and produce thrust. During operation, the maneuvering system 808 may use data obtained from one or more of the sensors 810.

The satellite 702 includes one or more sensors 810. The sensors 810 may include one or more engineering cameras 850. For example, an engineering camera 850 may be mounted on the satellite 702 to provide images of at least a portion of the photovoltaic array 830. Accelerometers 852 provide information about acceleration of the satellite 702 along one or more axes. Gyroscopes 854 provide information about rotation of the satellite 702 with respect to one or more axes. The sensors 810 may include a global navigation satellite system (GNSS) 856 receiver, such as Global Positioning System (GPS) receiver, to provide information about the position of the satellite 702 relative to Earth. In some implementations the GNSS 856 may also provide information indicative of velocity, orientation, and so forth. One or more star trackers 858 may be used to determine an orientation of the satellite 702. A coarse sun sensor 860 may be used to detect the sun, provide information on the relative position of the sun with respect to the satellite 702, and so forth. The satellite 702 may include other sensors 810 as well. For example, the satellite 702 may include a horizon detector, radar, lidar, and so forth.

The communication system 812 provides communication with one or more other devices, such as other satellites 702, ground stations 706, user terminals 708, and so forth. The communication system 812 may include one or more modems 876, digital signal processors, power amplifiers, antennas 882 (including at least one antenna that implements multiple antenna elements, such as a phased array antenna such as the antenna elements 102 of FIG. 1), processors, memories, storage devices, communications peripherals, interface buses, and so forth. Such components support communications with other satellites 702, ground stations 706, user terminals 708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 812 may be output to other systems, such as to the control system 804, for further processing. Output from a system, such as the control system 804, may be provided to the communication system 812 for transmission.

The communication system 812 may include hardware to support the intersatellite link 790. For example, an intersatellite link FPGA 870 may be used to modulate data that is sent and received by an ISL transceiver 872 to send data between satellites 702. The ISL transceiver 872 may operate using radio frequencies, optical frequencies, and so forth.

A communication FPGA 874 may be used to facilitate communication between the satellite 702 and the ground stations 706, UTs 708, and so forth. For example, the communication FPGA 874 may direct operation of a modem 876 to modulate signals sent using a downlink transmitter 878 and demodulate signals received using an uplink receiver 880. The satellite 702 may include one or more antennas 882. For example, one or more parabolic antennas may be used to provide communication between the satellite 702 and one or more ground stations 706. In another example, a phased array antenna may be used to provide communication between the satellite 702 and the UTs 708.

Figure 9:
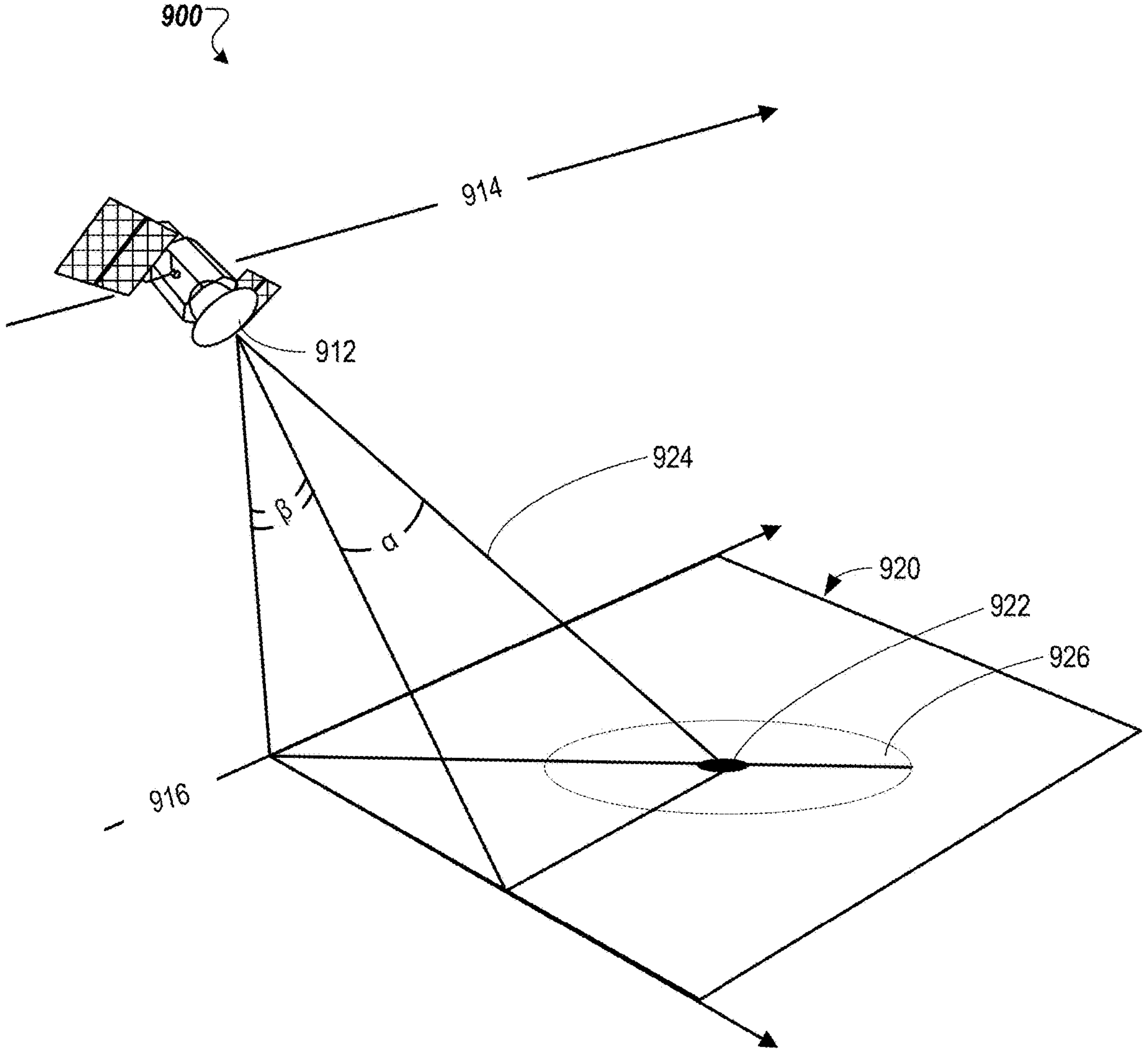
FIG. 9 illustrates a satellite including an antenna system that is steerable, according to embodiments of the present disclosure.

FIG. 9 illustrates the satellite 900 including an antenna system 912 that is steerable according to embodiments of the present disclosure. The satellite 900 can include can include the communication system 100, 300, 400, and 500 of FIGS. 1, 3, 4, and 5 as well as Rx DBF device 600 of FIG. 6. The antenna system 912 may include multiple antenna elements that form an antenna and that can be mechanically or electrically steered individually, collectively, or a combination thereof. In an example, the antenna is a phased array antenna.

In orbit 704, the satellite 900 follows a path 914, the projection of which onto the surface of the Earth forms a ground path 916. In the example illustrated in FIG. 9, the ground path 916 and a projected axis extending orthogonally from the ground path 916 at the position of the satellite 900, together define a region 920 of the surface of the Earth. In this example, the satellite 900 is capable of establishing uplink and downlink communications with one or more of ground stations, user terminals, or other devices within the region 920. In some embodiments, the region 920 may be located in a different relative position to the ground path 916 and the position of the satellite 900. For example, the region 920 may describe a region of the surface of the Earth directly below the satellite 900. Furthermore, embodiments may include communications between the satellite 900, an airborne communications system, and so forth.

As shown in FIG. 9, a communication target 922 (e.g., a ground station, a user terminal, or a CT (such as an HD CT)) is located within the region 920. The satellite 900 controls the antenna system 912 to steer transmission and reception of communications signals to selectively communicate with the communication target 922. For example, in a downlink transmission from the satellite 900 to the communication target 922, a signal beam 924 emitted by the antenna system 912 is steerable within an area 926 of the region 920. In some implementations, the signal beam 924 may include multiple subbeams. The extents of the area 926 define an angular range within which the signal beam 924 is steerable, where the direction of the signal beam 924 is described by a beam angle "$\alpha$" relative to a surface normal vector of the antenna system 912. In two-dimensional phased array antennas, the signal beam 924 is steerable in two dimensions, described in FIG. 9 by a second angle "$\beta$" orthogonal to the beam angle $\alpha$. In this way, the area 926 is a two-dimensional area within the region 920, rather than a linear track at a fixed angle determined by the orientation of the antenna system 912 relative to the ground path 916.

In FIG. 9, as the satellite 900 follows the path 914, the area 926 tracks along the surface of the Earth. In this way, the communication target 922, which is shown centered in the area 926 for clarity, is within the angular range of the antenna system 912 for a period of time. During that time, signals communicated between the satellite 900 and the communication target 922 are subject to bandwidth constraints, including but not limited to signal strength and calibration of the signal beam 924. In an example, for phased array antenna systems, the signal beam 924 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 10:
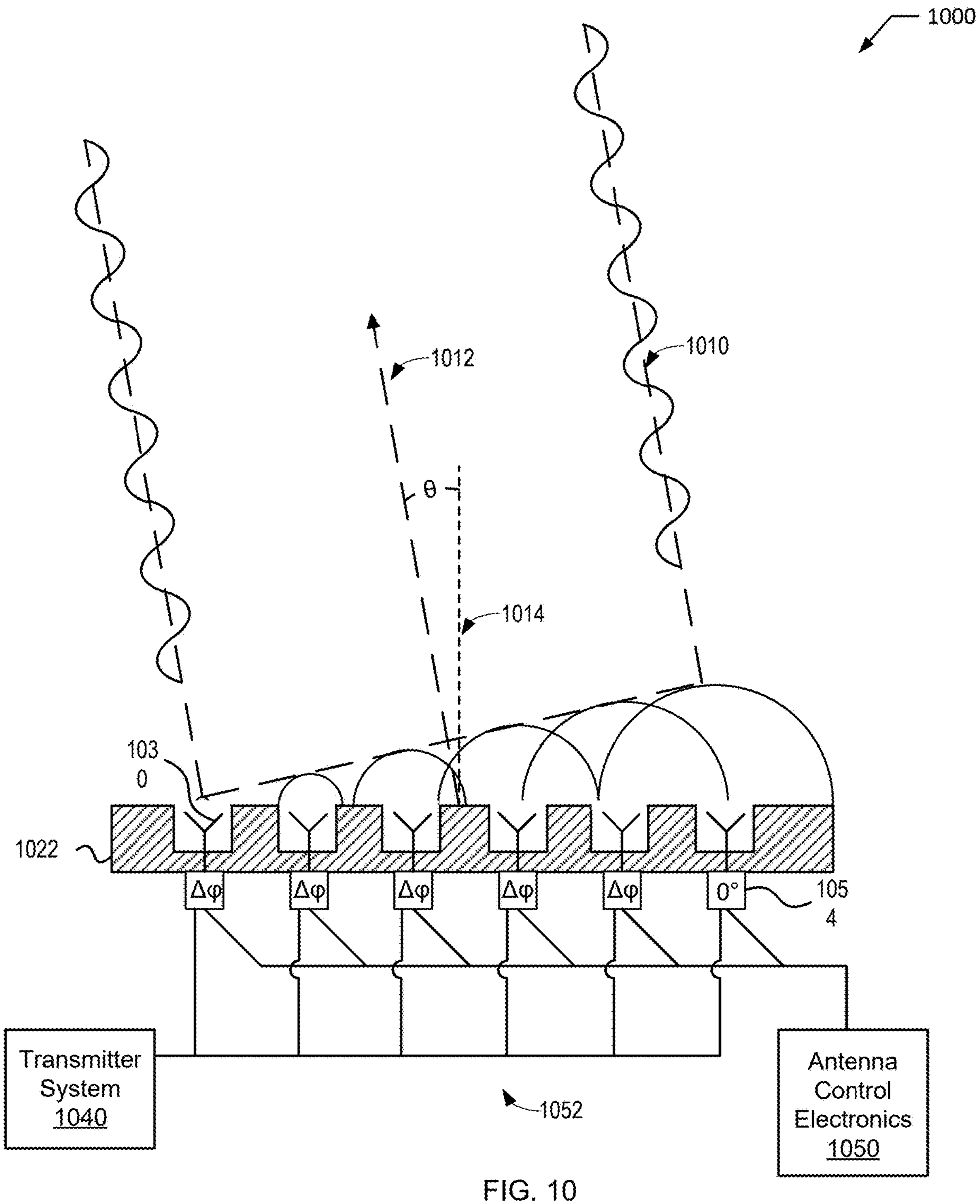
FIG. 10 illustrates a simplified schematic of an antenna, according to embodiments of the present disclosure.

FIG. 10 illustrates a simplified schematic of an antenna 1000, according to embodiments of the present disclosure. The antenna 1000 may be a component of the antenna system 912 of FIG. 9. As illustrated, the antenna 1000 is a phased array antenna that includes multiple antenna elements 1030 (e.g. antenna elements 102 in FIG. 1). Interference between the antenna elements 1030 forms a directional radiation pattern in both transmitter and receiver arrays forming a beam 1010 (beam extents shown as dashed lines). The beam 1010 is a portion of a larger transmission pattern (not shown) that extends beyond the immediate vicinity of the antenna 1000. The beam 1010 is directed along a beam vector 1012, described by an angle "θ" relative to an axis 1014 normal to a surface of the antenna 1000. As described below, the beam 1010 is one or more of steerable or shapeable through control of operating parameters including, but not limited to a phase and an amplitude of each antenna element 1030.

In FIG. 10, the antenna 1000 includes, within a transmitter section 1022, the antenna elements 1030, which may include, but are not limited to, omnidirectional transmitter antennas coupled to a transmitter system 1040, such as the downlink transmitter 878. The transmitter system 1040 provides a signal, such as a downlink signal to be transmitted to a ground station on the surface. The downlink signal is provided to each antenna element 1030 as a time-varying signal that may include several multiplexed signals. To steer the beam 1010 relative to the axis 1014, the phased array antenna system 1000 includes antenna control electronics 1050 controlling a radio frequency (RF) feeding network 1052, including multiple signal conditioning components 1054 interposed between the antenna elements 1030 and the transmitter system 1040. The signal conditioning components 1054 introduce one or more of a phase modulation or an amplitude modulation (e.g. by phase shifters 116 in FIG. 1), as denoted by "Δφ" in FIG. 10, to the signal sent to the antenna elements 1030. As shown in FIG. 10, introducing a progressive phase modulation produces interference in the individual transmission of each antenna element 1030 that generates the beam 1010.

The phase modulation imposed on each antenna element 1030 can differ and can be dependent on a spatial location of a communication target that determines an optimum beam vector (e.g., where the beam vector 1012 is found by one or more of maximizing signal intensity or connection strength). The optimum beam vector may change with time as the communication target 922 moves relative to the phased array antenna system 1000.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
an array antenna;
a first receiver chain coupled to a first antenna element of the array antenna, wherein the first receiver chain receives a first radio frequency (RF) signal and converts the first RF signal into first digital data;
a second receiver chain coupled to a second antenna element of the array antenna, wherein the second receiver chain receives a second RF signal and converts the second RF signal into second digital data;
a digital beamforming (DBF) device coupled to first receiver chain and the second receiver chain, wherein the DBF device comprises:
a first multi-channel channelizer that processes the first digital data and outputs first in-phase data and first quadrature data associated with a first channel;
a second multi-channel channelizer that processes the second digital data and outputs second in-phase data and second quadrature data associated with the first channel;
a first Coordinate Rotation Digital Computer (CORDIC) phase shifter that generates third in-phase data by phase shifting the first in-phase data and generates third quadrature data by phase shifting the first quadrature data;
a second CORDIC phase shifter that generates fourth in-phase data by phase shifting the second in-phase data and generates fourth quadrature data by phase shifting the second quadrature data;
a first digital combiner that generates fifth in-phase data by adding the third in-phase data and the fourth in-phase data;
a second digital combiner that generates fifth quadrature data by adding the third quadrature data and the fourth quadrature data;
a first multiplier that generates sixth in-phase data by multiplying the fifth in-phase data by a first value;
a second multiplier generates sixth quadrature data by multiplying the fifth quadrature data by the first value; and
serializer/deserializer (SERDES) circuitry that outputs the sixth in-phase data and the sixth quadrature data to a second DBF device or a modem.

2. The communication system of claim 1, wherein:
the first multi-channel channelizer outputs seventh in-phase data and seventh quadrature data associated with a second channel;
the second multi-channel channelizer outputs eighth in-phase data and eighth quadrature data associated with the second channel; and
the DBF further comprises:
a third CORDIC phase shifter that generates ninth in-phase data by phase shifting the seventh in-phase data and generates ninth quadrature data by phase shifting the seventh quadrature data;
a fourth CORDIC phase shifter that generates tenth in-phase data by phase shifting the eighth in-phase data and generates tenth quadrature data by phase shifting the eighth quadrature data;
a third digital combiner that generates eleventh in-phase data by adding the ninth in-phase data and the tenth in-phase data;
a fourth digital combiner that generates eleventh quadrature data by adding the ninth quadrature data and the tenth quadrature data;
a third multiplier that generates twelfth in-phase data by multiplying the eleventh in-phase data by the first multiplier value;
a fourth multiplier generates twelfth quadrature data by multiplying the eleventh quadrature data by the first multiplier value; and
the SERDES circuitry outputs the twelfth in-phase data and the twelfth quadrature data to the second DBF device or the modem.

3. A circuit comprising:
an analog-to-digital converter (ADC); and
digital signal processing (DSP) circuitry coupled to the ADC, wherein the DSP circuitry comprises:
a first phase shifter that generates second data by phase shifting first data according to a rotation-based operation;
a second phase shifter that generates fourth data by phase shifting third data according to the rotation-based operation;
a combiner that generates fifth data by combining the second data and the fourth data; and
a multiplier that generates sixth data by multiplying the fifth data by a constant value, wherein multiplying the fifth data by the constant value causes the sixth data to be scaled with respect to (i) the generation of the second data, (ii) the generation of the fourth data, and (iii) the generation of the fifth data.

4. The circuit of claim 3, wherein the second data corresponds to a first antenna element, and the fourth data corresponds to a second antenna element.

5. The circuit of claim 4, wherein the DSP circuitry comprises:
a first channelizer that generates the first data associated with a first channel and seventh data associated with a second channel;
a second channelizer that generates the third data associated with the first channel and eighth data associated with the second channel;
a third phase shifter that generates ninth data by phase shifting the seventh data according to a rotation-based operation without multiplication of the seventh data, the ninth data corresponding to the first antenna element and the second channel;
a fourth phase shifter that generates tenth data by phase shifting the eighth data according to a rotation-based operation without multiplication of the eighth data, the tenth data corresponding to the second antenna element and the second channel;
a second combiner that generates eleventh data by adding the ninth data and the tenth data; and
a second multiplier that generates twelfth data by multiplying the eleventh data by the constant value.

6. The circuit of claim 3, wherein the first data comprises a first in-phase value of a first radio frequency (RF) signal received at a first antenna element and a first quadrature value of the first RF signal, and wherein the second data comprises a second in-phase value of a second RF signal received at a second antenna element and a second quadrature value of the second RF signal, the second in-phase value being phase shifted from the first in-phase value according to a coefficient value representing a shift amount and the second quadrature value being phase shifted from the first quadrature value according to the coefficient value.

7. The circuit of claim 3, wherein the DSP circuitry comprises:

a first N-point channelizer that outputs a first set of N output values, where N is a positive integer that represents a number of channels;

a second N-point channelizer that outputs a second set of N output values;

a set of combiners, each combiner adds one of the first set of N output values and one of the second set of N output values and outputs a set of output values; and a set of multipliers, each multiplier multiplies one of the set of output values by the constant value.

8. The circuit of claim 3, wherein the DSP circuitry comprises a beam splitter that generates the first data associated with a first beam on a per channel basis.

9. The circuit of claim 3, further comprising:

a set of L number of receiver chains, wherein each receiver chain of the set of L number of receiver chains comprises RF down converter circuitry, wherein L is a positive integer representing a number of antenna elements of an array antenna;

a set of L number of transmitter chains, wherein each transmitter chain of the set of L number of transmitter chains comprises RF up converter circuitry;

a set of L number of ADCs comprising the ADC, wherein the DSP circuitry comprises:

a set of L number of element engines, each element engine of the set of L number of element engines comprising a Coordinate Rotation Digital Computer (CORDIC) phase shifter; and a set of M number of beam engines, each beam engine of the set of M number of beam engines comprises an element combiner, wherein M is a positive integer representing a number of beams of the array antenna.

10. The circuit of claim 9, wherein the circuit is a first digital beamforming (DBF) device comprising serializer/deserializer (SERDES) circuitry that receives data from the set of M number of beam engines and outputs digital data to a second DBF device or modem.

11. The circuit of claim 3, wherein:

the first phase shifter receives a first in-phase value of a first radio frequency (RF) signal received at a first antenna element and a first quadrature value of the first RF signal associated with the first data and generates a second in-phase value of the first RF signal and a second quadrature value of the second RF signal associated with the second data;

the second phase shifter receives a third in-phase value of a second RF signal received at a second antenna element and third quadrature value of the second RF signal associated with the third data and generates a fourth in-phase value of the second RF signal and a fourth quadrature value of the second RF signal associated with the fourth data;

the combiner comprises a first adder that adds the second in-phase value and the fourth in-phase value and generates a fifth in-phase value associated with the fifth data and a second adder that adds the second quadrature value and the fourth quadrature value and generates a fifth quadrature value associated with the fifth data;

the multiplier generates a sixth in-phase value associated with the sixth data by multiplying the fifth in-phase value by the constant value; and the multiplier generates a sixth quadrature value associated with the sixth data by multiplying the fifth quadrature value by the constant value.

12. A communication system comprising:

a phased array antenna; and a first beamforming circuit comprising:

a plurality of transmitter-receiver chains, each coupled to an antenna element of the phased array antenna;

a digital processing circuit coupled to the plurality of transmitter-receiver chains, the digital processing circuit comprising:

a first Coordinate Rotation Digital Computer (CORDIC) phase shifter that generates second data by phase shifting first data;

a second CORDIC phase shifter that generates fourth data by phase shifting third data;

a combiner that generates fifth data by combining the second data and the fourth data; and a multiplier that generates sixth data by multiplying the fifth data by a constant value, wherein multiplying the fifth data by the constant value causes the sixth data to be scaled with respect to (i) the generation of the second data, (ii) the generation of the fourth data, and (iii) the generation of the fifth data.

13. The communication system of claim 12, wherein the second data corresponds to a first antenna element of the phased array antenna, and the fourth data corresponds to a second antenna element of the phased array antenna.

14. The communication system of claim 13, wherein the digital processing circuit further comprises:

a first channelizer that generates the first data associated with a first channel and seventh data associated with a second channel;

a second channelizer that generates the third data associated with the first channel and eighth data associated with the second channel;

a third CORDIC phase shifter that generates ninth data by phase shifting the seventh data, the ninth data corresponding to the first antenna element and the second channel;

a fourth CORDIC phase shifter that generates tenth data by phase shifting the eighth data, the tenth data corresponding to the second antenna element and the second channel;

a second combiner that generates eleventh data by adding the ninth data and the tenth data; and a second multiplier that generates twelfth data by multiplying the eleventh data by the constant value.

15. The communication system of claim 14, wherein the third CORDIC phase shifter generates the ninth data and the fourth CORDIC phase shifter generates the tenth data according to a rotation-based operation without multiplication of the seventh data or the eighth data.

16. The communication system of claim 13, wherein:

the first CORDIC phase shifter receives a first in-phase value of a first radio frequency (RF) signal received at the first antenna element and a first quadrature value associated with the first data of the first RF signal and generates a second in-phase value and a second quadrature value associated with the second data;

the second CORDIC phase shifter receives a third in-phase value of a second RF signal received at the second antenna element and third quadrature value associated with the third data of the second RF signal and generates a fourth in-phase value and a fourth quadrature value associated with the fourth data;

the combiner comprises a first adder that adds the second in-phase value and the fourth in-phase value and obtains a fifth in-phase value associated with the fifth data and a second adder that adds the second quadrature value and the fourth quadrature value and obtains a fifth quadrature value associated with the fifth data;

the multiplier generates a sixth in-phase value associated with the sixth data by multiplying the fifth in-phase value by the constant value; and the multiplier generates a sixth quadrature value associated with the sixth data by multiplying the fifth quadrature value by the constant value.

17. The communication system of claim 16, wherein the digital processing circuit further comprises:

first serializer/deserializer (SERDES) circuitry that outputs the sixth in-phase value; and second SERDES circuitry that outputs the sixth quadrature value.

18. The communication system of claim 12, wherein the first CORDIC phase shifter generates the second data and the second CORDIC phase shifter generates fourth data according to a rotation-based operation without multiplication of the second data or the fourth data.

19. The communication system of claim 12, wherein the first beamforming circuit comprises serializer/deserializer (SERDES) circuitry that outputs digital data to a second beamforming circuit or a modem.

20. The communication system of claim 12, where the plurality of transmitter-receiver chains further comprises:

a set of L number of receiver chains, wherein each receiver chain of the set of L number of receiver chains comprises RF down converter circuitry, wherein L is a positive integer representing a number of antenna elements of the phased array antenna;

a set of L number of transmitter chains, wherein each transmitter chain of the set of L number of transmitter chains comprises RF up converter circuitry;

a set of L number of analog-to-digital converters (ADCs);

a set of L number of element engines comprising the first CORDIC phase shifter and the second CORDIC phase shifter, each element engine of the set of L number of element engines comprising a CORDIC phase shifter; and a set of M number of beam engines, each beam engine of the set of M number of beam engines comprises an element combiner, wherein M is a positive integer representing a number of beams of the phased array antenna.

* * * * *